US010260789B2

(12) United States Patent
Alshourbagy et al.

(10) Patent No.: US 10,260,789 B2
(45) Date of Patent: Apr. 16, 2019

(54) ICE MAKING ASSEMBLY WITH TWIST ICE TRAY AND DIRECTIONAL COOLING

(71) Applicant: Whirlpool Corporation, Benton Harbor, MI (US)

(72) Inventors: Mohamed Alshourbagy, Stevensville, MI (US); Arivazhagan Chandrashekaran, Saint Joseph, MI (US); Kylie M. McCollum, Saint Joseph, MI (US); Nicholas L. Pohl, Saint Joseph, MI (US); Vijaykumar Sathyamurthi, Stevensville, MI (US); Andrew M. Tenbarge, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/248,520

(22) Filed: Aug. 26, 2016

(65) Prior Publication Data

US 2017/0299244 A1    Oct. 19, 2017

Related U.S. Application Data

(60) Provisional application No. 62/322,157, filed on Apr. 13, 2016.

(51) Int. Cl.
*F25C 1/10* (2006.01)
*F25C 1/20* (2006.01)
(Continued)

(52) U.S. Cl.
CPC .................. *F25C 1/20* (2013.01); *F25C 1/10* (2013.01); *F25C 1/24* (2013.01); *F25C 5/06* (2013.01);
(Continued)

(58) Field of Classification Search
CPC ...... F25C 1/20; F25C 5/06; F25C 1/24; F25C 1/10; F25C 5/08; F25C 2305/022
See application file for complete search history.

(56) References Cited

U.S. PATENT DOCUMENTS 3,952,539 A    4/1976  Hanson et al.
5,182,916 A *  2/1993  Oike ....................... F25C 1/04
                                                      62/135
(Continued)

FOREIGN PATENT DOCUMENTS

EP         2743609 A2    6/2014
JP       2011064371 A    3/2011
(Continued)

OTHER PUBLICATIONS

International Searching Authority, "International Search Report and Written Opinion," issue in connection with PCT Application No. PCT/US2017/027373, dated Jul. 20, 2017, 8 pages.
(Continued)

Primary Examiner — Ana M Vazquez
(74) Attorney, Agent, or Firm — Nyemaster Goode, P.C.

(57) ABSTRACT

An ice piece making assembly and a refrigeration appliance containing the ice piece making assembly is disclosed. The ice making assembly produces ice pieces by directional freezing and includes: an ice piece forming tray having a motor engaging end, a distal end, a first side, a second side and a bottom surface, a plurality of ice piece making compartments divided by divider walls, and a plurality of heat sinks engaged to the bottom surface of the ice making compartments and deliver defrost water to a drain or defrost water catch tray positioned at at least one of the distal end and the motor engaging end; and an ice piece forming tray canopy spaced a distance above the ice piece forming tray
(Continued)

wherein the ice piece forming tray canopy comprises a heater and a temperature sensor.

20 Claims, 18 Drawing Sheets

(51) Int. Cl.
    *F25C 1/24*     (2018.01)
    *F25C 5/06*     (2006.01)
    *F25C 5/08*     (2006.01)
    *F25D 11/02*     (2006.01)

(52) U.S. Cl.
    CPC ................ *F25C 5/08* (2013.01); *F25D 11/02* (2013.01); *F25C 2305/022* (2013.01); *F25C 2400/10* (2013.01); *F25C 2700/12* (2013.01)

(56) References Cited

U.S. PATENT DOCUMENTS

| | | | |
|---|---|---|---|
| 6,820,433 B2 | 11/2004 | Hwang | |
| 7,437,885 B2 | 10/2008 | Wu et al. | |
| 7,628,030 B2 | 12/2009 | Visin et al. | |
| 7,628,031 B2 | 12/2009 | Visin et al. | |
| 7,841,191 B2 | 11/2010 | Visin et al. | |
| 7,849,707 B2 | 12/2010 | Wu | |
| 7,891,207 B2 | 2/2011 | Visin et al. | |
| 7,913,510 B2 | 3/2011 | Visin et al. | |
| 7,913,514 B2 | 3/2011 | Visin et al. | |
| 7,946,125 B2 | 5/2011 | Visin et al. | |
| 8,096,142 B2 | 1/2012 | Visin et al. | |
| 8,402,783 B2 | 3/2013 | Kim et al. | |
| 8,539,780 B2 | 9/2013 | Herrera et al. | |
| 8,844,313 B2 | 9/2014 | DeVos | |
| 9,689,600 B2 * | 6/2017 | Jeong | F25C 1/04 |
| 2006/0086134 A1 * | 4/2006 | Voglewede | F25C 1/10 62/351 |
| 2009/0126391 A1 | 5/2009 | Heger et al. | |
| 2009/0277191 A1 | 11/2009 | Heger et al. | |
| 2010/0126203 A1 | 5/2010 | Kim et al. | |
| 2010/0275635 A1 * | 11/2010 | Lee | F25C 5/06 62/344 |
| 2012/0279240 A1 | 11/2012 | Jeong et al. | |
| 2014/0165617 A1 * | 6/2014 | Boarman | F25B 21/02 62/68 |
| 2016/0258664 A1 * | 9/2016 | Visin | F25C 5/06 |

FOREIGN PATENT DOCUMENTS

| | | |
|---|---|---|
| RU | 2256128 C1 | 7/2005 |
| WO | 2006076979 A1 | 7/2006 |
| WO | 2008026843 A1 | 3/2008 |

OTHER PUBLICATIONS

International Searching Authority, "International Search Report and Written Opinion," issue in connection with PCT Application No. PCT/US2017/027375, dated Jul. 13, 2017, 8 pages.

International Searching Authority, "International Search Report and Written Opinion," issue in connection with PCT Application No. PCT/US2017/027379, dated Jul. 13, 2017, 8 pages.

International Searching Authority, "International Search Report and Written Opinion," issue in connection with PCT Application No. PCT/US2017/027380, dated Jul. 13, 2017, 8 pages.

European Patent Office, "European Search Report and Written Opinion", issue in connection with Application No. 17186338.4, dated Feb. 1, 2018, 11 pages.

* cited by examiner

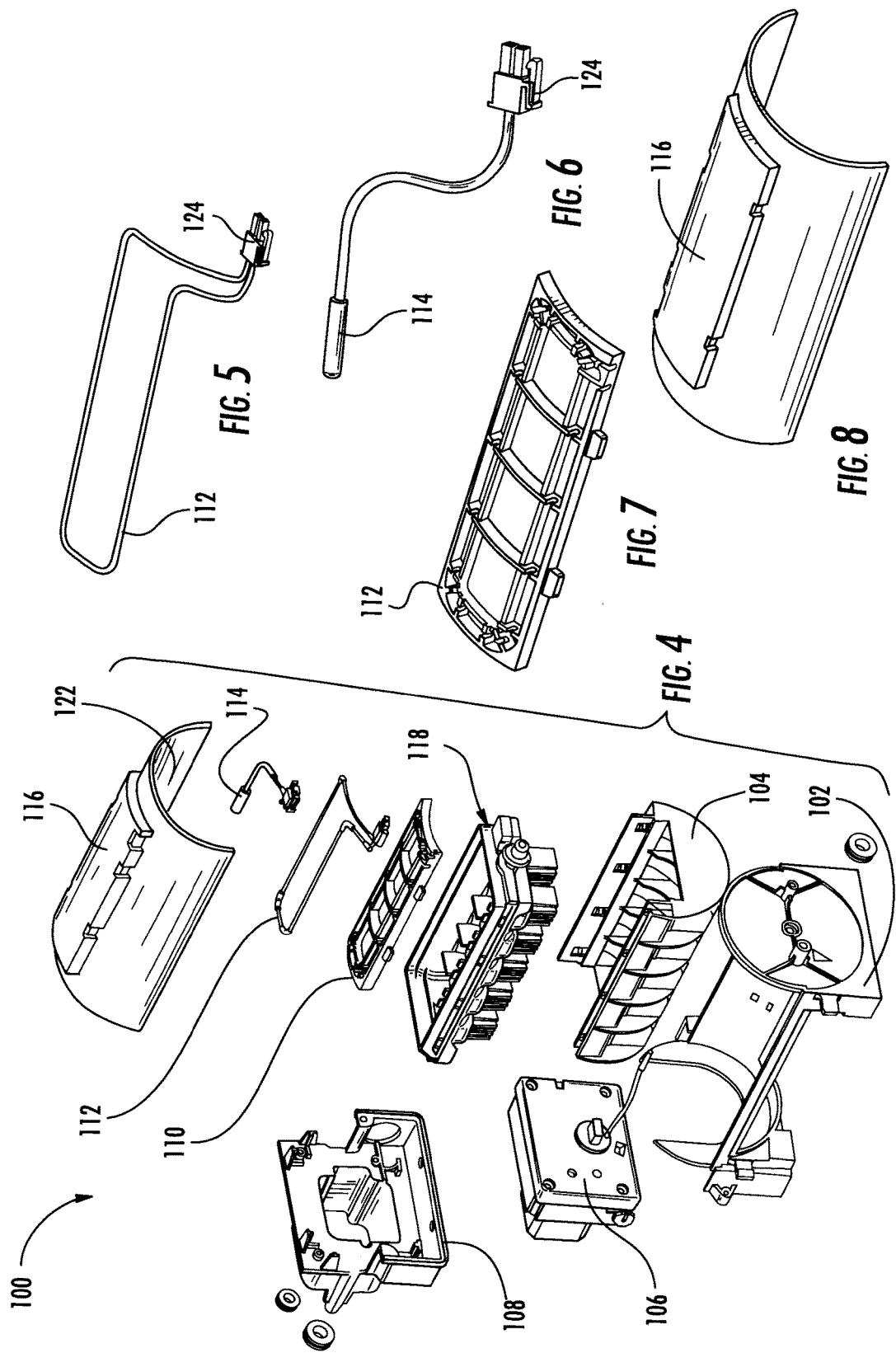

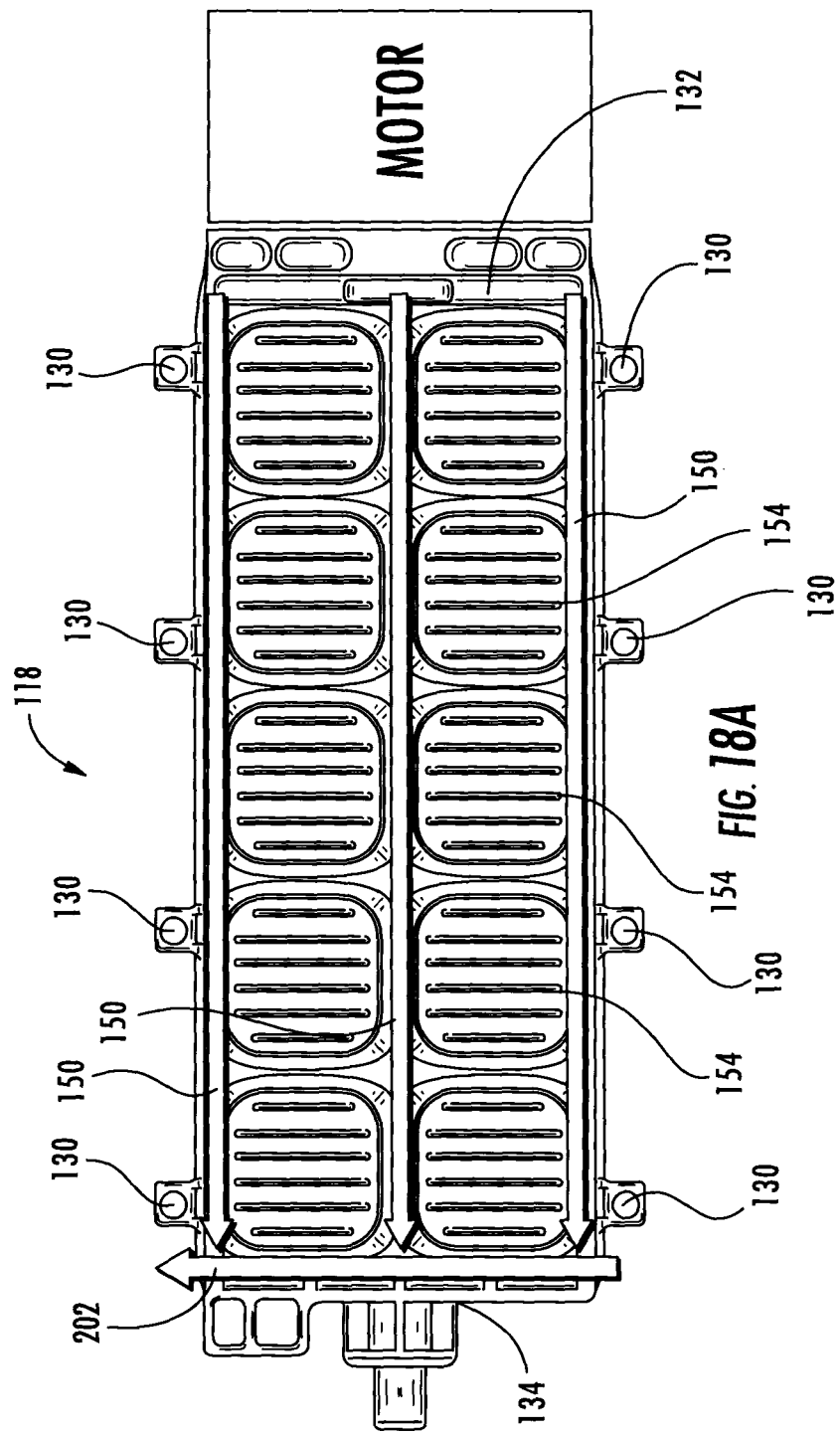

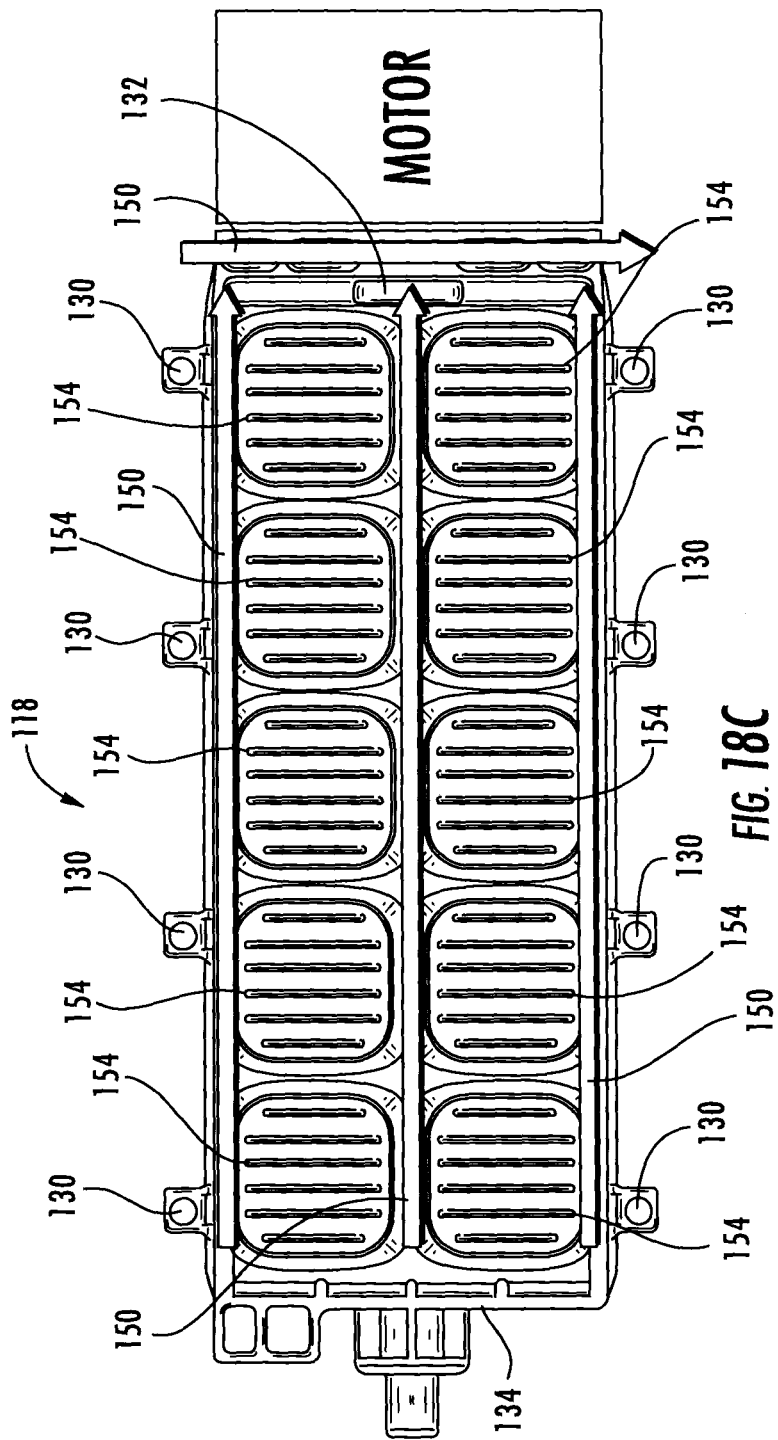

ICE MAKING ASSEMBLY WITH TWIST ICE TRAY AND DIRECTIONAL COOLING

CROSS-REFERENCE TO RELATED APPLICATION

This application claims priority to and the benefit of U.S. Provisional Application Ser. No. 62/322,157 entitled CLEAR ICE MAKING APPLIANCE AND METHOD OF SAME, which was filed on Apr. 13, 2016, the entire disclosure of which is hereby incorporated by reference.

SUMMARY OF THE DISCLOSURE

An aspect of the present disclosure is generally directed to an ice making assembly that includes: an ice piece forming tray having a motor engaging end, a distal end, a first side, a second side and a bottom surface and a plurality of ice piece making compartments divided by divider walls; and a plurality of defrost water water channels. At least one defrost water water channel is positioned at least substantially parallel to or along an axis of rotation of the ice piece forming tray and along at least one of the motor engaging end and the distal end. Each of the plurality of defrost water water channels engage one another in fluid communication with one another and are configured to receive defrost water from a plurality of heat sinks engaged to the bottom surface of the ice making compartments and deliver defrost water to a drain or defrost water catch tray positioned at at least one of the distal end and the motor engaging end.

Yet another aspect of the present disclosure is generally directed toward a refrigerator that includes: an ice piece making assembly that produces ice pieces. The ice piece making assembly includes: an ice piece forming tray having a motor engaging end, a distal end, a first side, a second side, a bottom surface, a plurality of ice piece making compartments divided by divider walls, and a plurality of heat sinks engaged to the bottom surface of the ice making compartments and deliver defrost water to a drain or defrost water catch tray positioned at at least one of the distal end and the motor engaging end; and an ice piece forming tray canopy spaced a distance above the ice piece forming tray where the ice piece forming tray canopy includes a heater and a temperature sensor.

Another aspect of the present disclosure is generally directed to a method of making ice pieces that includes the steps of: providing an ice making assembly having: a motor; an ice piece forming tray having a motor engaging end, a distal end, a first side, a second side and a bottom surface; and a plurality of ice piece making compartments divided by divider walls; a plurality of metal heat sinks engaged to the bottom surface of the ice making compartments, wherein the heat sinks have a plurality of downwardly extending and spaced apart metal fins that extend away from the bottom surface of each ice piece making compartment; at least one defrost water water channel wherein at least one defrost water water channel is positioned at least substantially parallel to or along an axis of rotation of the ice piece forming tray and along at least one of the motor engaging end and the distal end wherein the defrost water water channels engage one another in fluid communication with one another; placing an ice piece forming tray canopy a spaced distance above and coving the ice piece forming tray wherein the ice piece forming tray canopy includes a heater and a temperature sensor; filling at least one of the ice piece making compartments with an amount of water; oscillating the ice piece forming tray; using the temperature sensor and the heater to maintain an air temperature above the ice piece making compartments above freezing during at least a portion of the time for forming the ice pieces; moving air below 32 degrees Fahrenheit through spaces between the downwardly extending spaced apart fins; forming the ice pieces within the ice piece making compartments directionally with freezing starting from a portion of the ice piece making compartments distal from the canopy and proximate the heat sink and toward a top of the ice piece making compartments; rotating the ice piece forming tray with one or more formed ice pieces spaced within the one or more ice piece making compartments that were filled with water to invert the ice piece forming tray until the tray is at least about 160 rotated from its level, flat, and ice piece forming compartment upwardly facing position; and twisting the ice piece forming tray to release the one or more ice pieces within the ice piece forming tray. The step of rotating the ice piece forming tray includes moving the fins into closer proximity to the canopy and into a volume of air proximate the canopy that has a temperature above freezing due to heat applied to the volume of air proximate the canopy from the heater such that frost on the metal fins melts and enters at least one of the defrost water water channels.

BRIEF DESCRIPTION OF THE FIGURES

The foregoing summary, as well as the following detailed description of the disclosure, will be better understood when read in conjunction with the appended drawings. It should be understood, however, that the disclosure and the scope of the claims are not limited to the precise arrangements and instrumentalities shown. In addition, drawings are not necessarily to scale. Certain features of the disclosure may be exaggerated in scale or shown in schematic form in the interest of clarity and conciseness.

In the drawings:

FIG. 4 is an exploded view of the icemaker according to an aspect of the present disclosure;

FIG. 5 shows a heater according to an aspect of the present disclosure;

FIG. 6 shows a thermistor according to an aspect of the present disclosure;

FIG. 7 shows a heater bracket according to an aspect of the present disclosure;

FIG. 8 shows a bracket/frame cover according to an aspect of the present disclosure;

FIG. 18A is a schematic bottom view of the ice making assembly according to an aspect of the present disclosure where the defrost water water channels convey defrost water melted off the metal ice fins of the assembly to the distal end of the ice piece forming tray;

FIG. 18C is a schematic bottom view of an ice making assembly according to an aspect of the present disclosure wherein the defrost water water channels convey defrost water melted off the metal ice fins of the assembly to the motor engaging end of the ice piece forming tray;

DETAILED DESCRIPTION

Before further description, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting in any manner. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1:
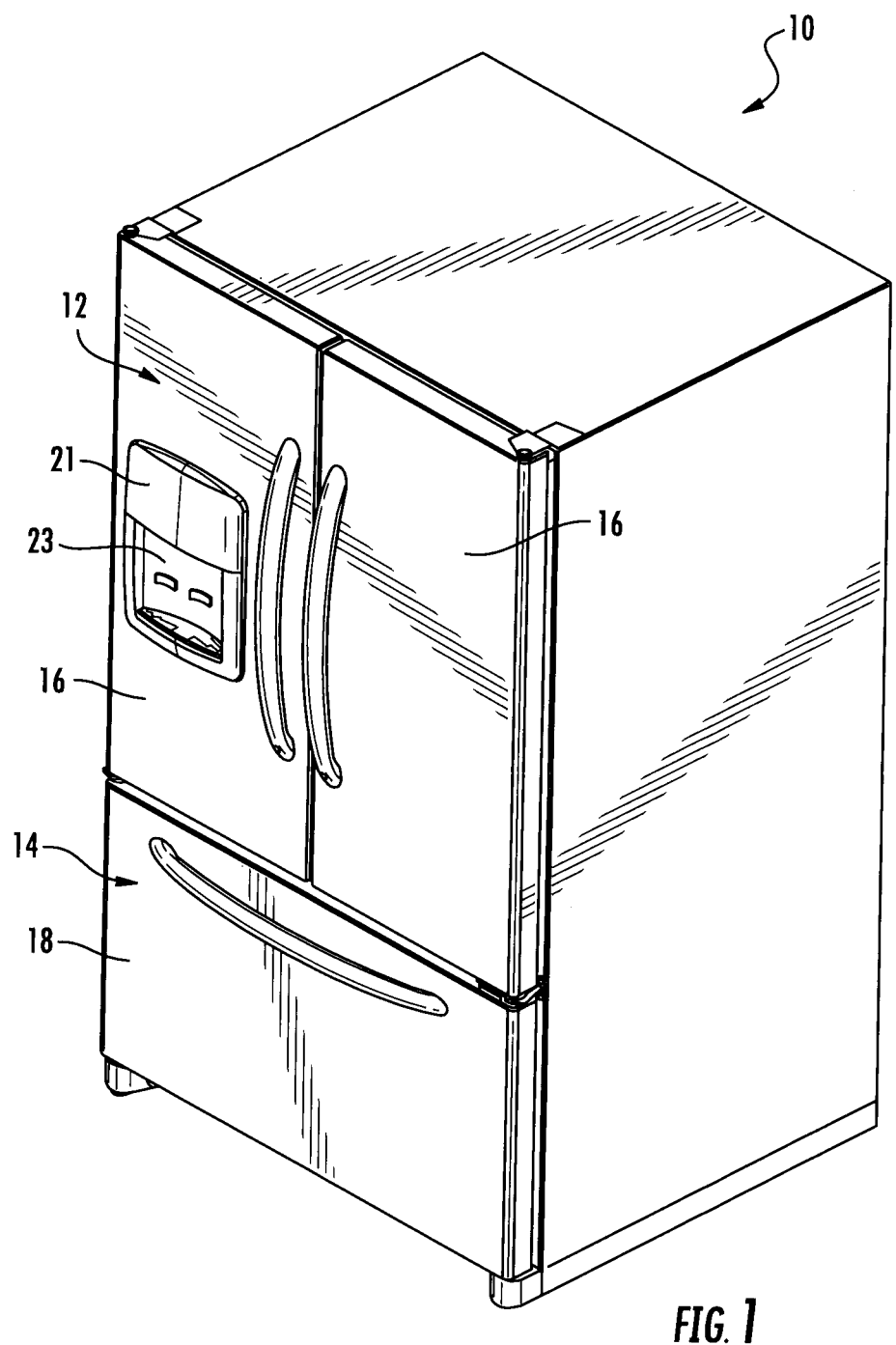
FIG. 1 is an upper perspective view of a refrigerator as disclosed.
Figure 1A:
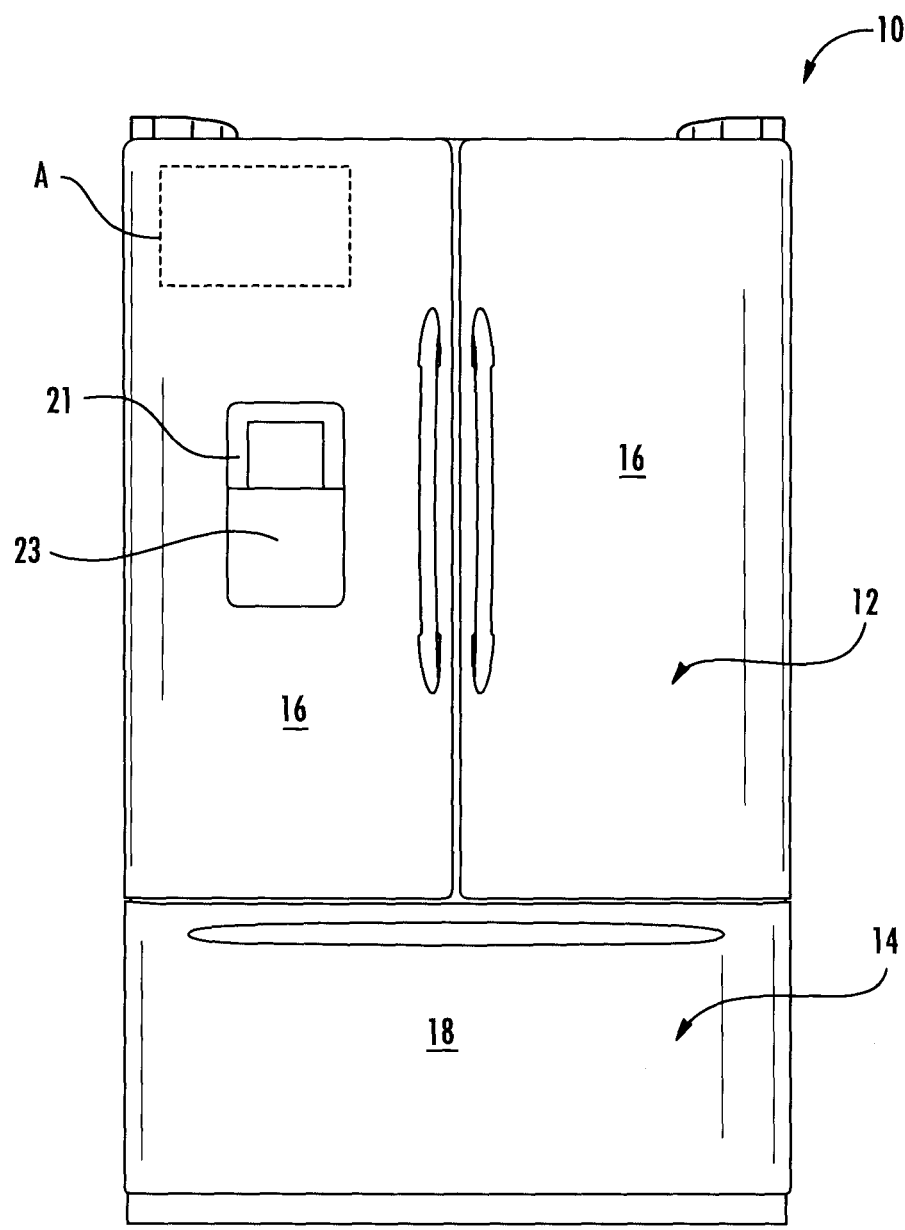
FIG. 1A is an elevated front view of a French door bottom mount refrigerator freezer incorporating an ice making assembly of the present disclosure.
Figure 2:
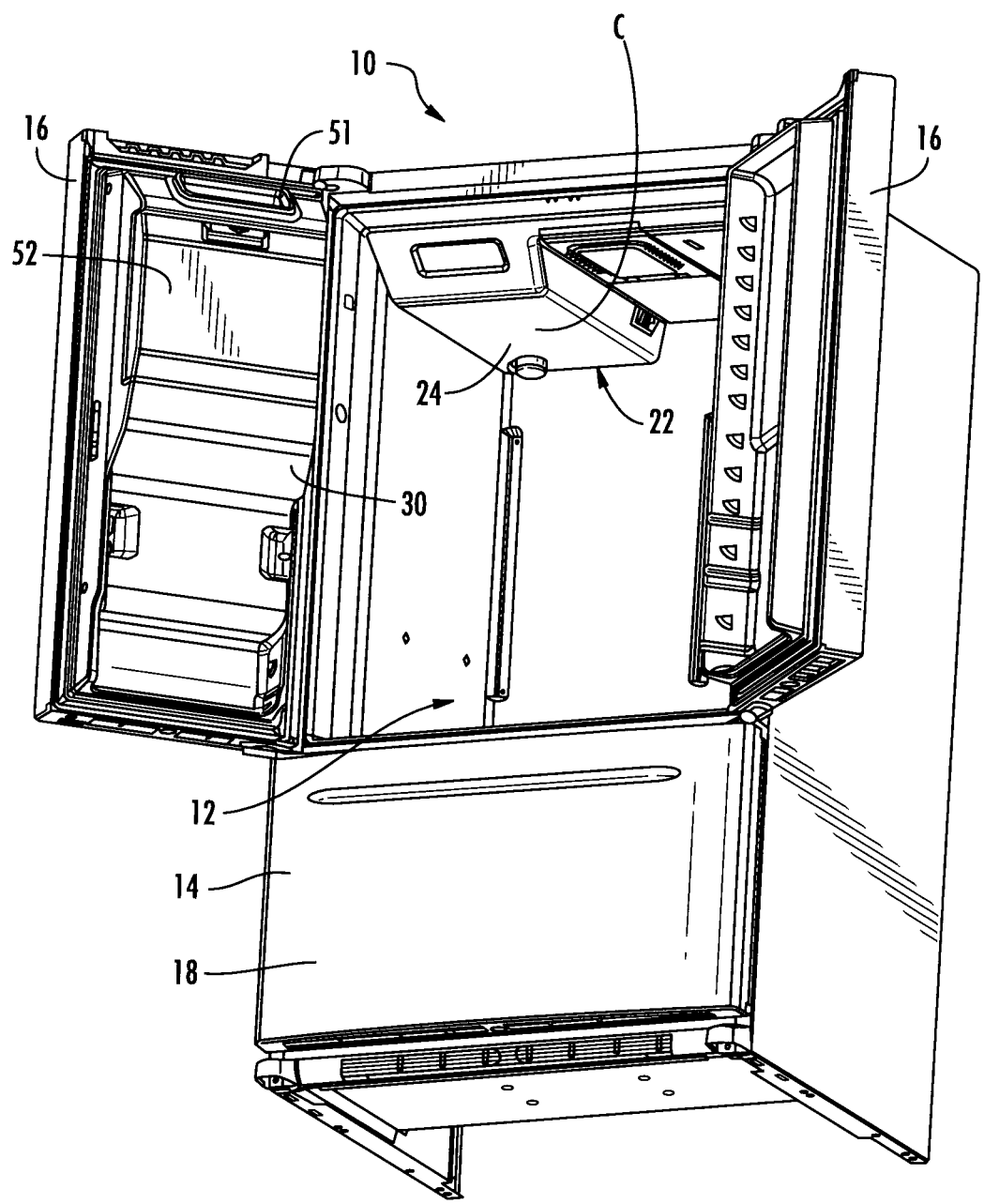
FIG. 2 is a perspective view of an embodiment of a refrigerator as disclosed with the fresh food (refrigerated) compartment doors open.
Figure 2A:
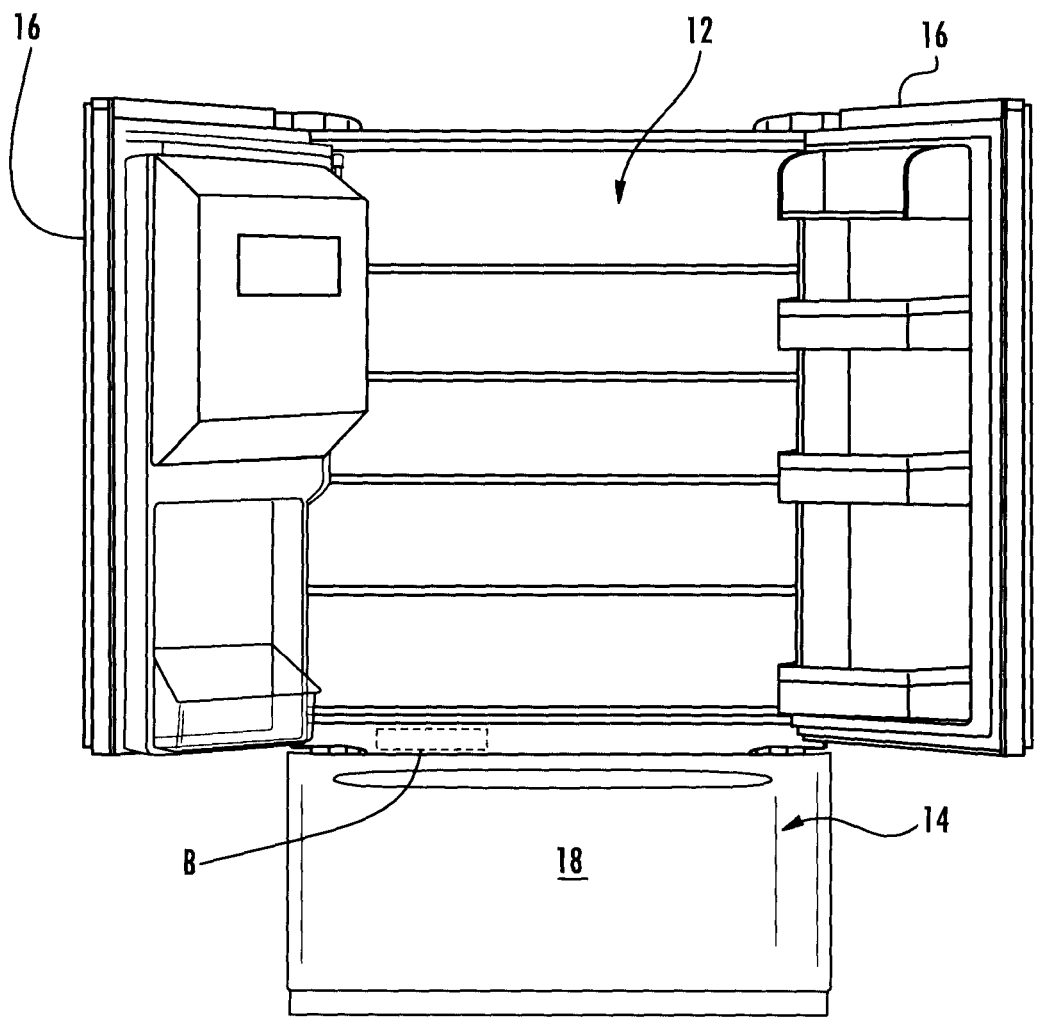
FIG. 2A is an elevated front view of a French door bottom mount refrigerator freezer with the fresh food (refrigerated) compartment doors open.
Figure 3:
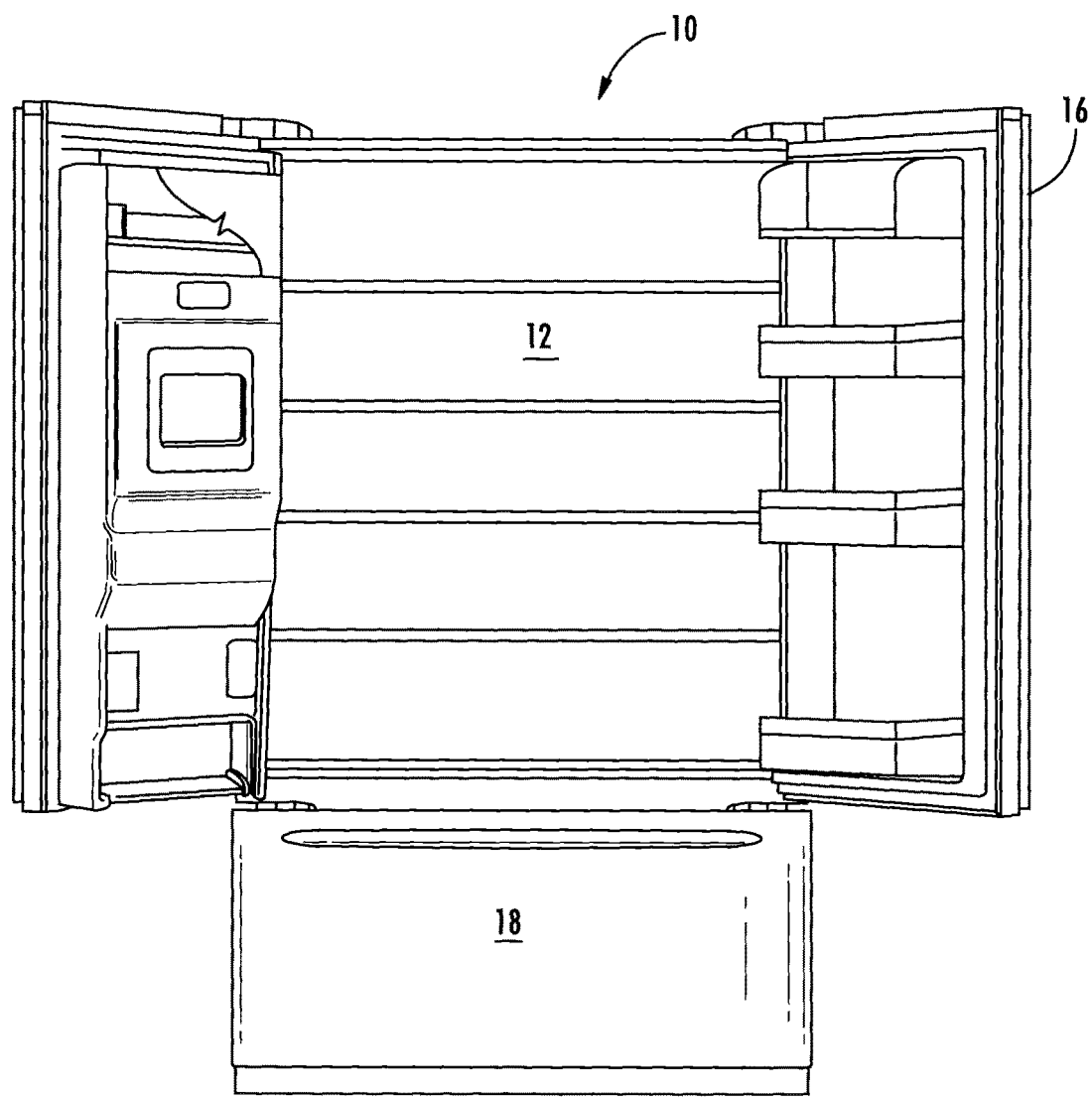
FIG. 3 is a front view of a refrigerator as disclosed with the fresh food (refrigerated) compartment doors open.

The present disclosure is generally directed to an ice making assembly with a twist ice tray, metal heat sink with heat sink fins and directional cooling due to the use of a canopy and heater. The system also allows for the defrosting of frost that may build up on the heat sink fins and transports the defrost water through defrost water water channels associated with the ice making assembly. A standard French door bottom mount refrigerator 10 is shown in FIGS. 1-3. The refrigerator 10 typically includes a refrigeration compartment 12 with operating temperatures above freezing and at least one freezer compartment 14 with operating temperatures at or below freezing during normal operation. While a French door bottom mount refrigerator is shown, the refrigerator appliance could be a side by side configuration, a top mount freezer or have one or more pantry drawers. Any configuration of the appliance may incorporate the ice making assemblies of the present disclosure. In fact, the ice making assembly could conceivably be used in connection with a dedicated ice making appliance and not necessarily refrigerator that has the capability to store and preserve food. Typically, the refrigerator compartment 12 of the appliance is enclosed by one or more refrigerator compartment doors 16. Typically, two doors 16 are used to enclose the refrigerator compartment of a French door bottom mount refrigerator and one freezer compartment door 18 for the freezer compartment of the appliance. A water and ice dispenser 21, which often includes a recessed dispensing well 23, is located on one of the doors 14 of the appliance 10. The dispenser 21 dispenses water, typically filtered water, and ice produced by the ice making assembly 100. The ice making assembly 100 can be located in a variety of locations including, within the door (generally location A in FIG. 1A, for example), above the appliance, and within the top mullion of the appliance. If ice is produced for storage within the freezer compartment behind the freezer compartment door 16, the ice making assembly can be positioned within the ice making compartment or within the mullion between the refrigerator compartment and the freezer compartment as generally shown by location B in FIG. 2A, for example. An additional possible location for the ice making assembly is shown by location C in FIG. 2 which is in/proximate the top mullion.

Figure 9:
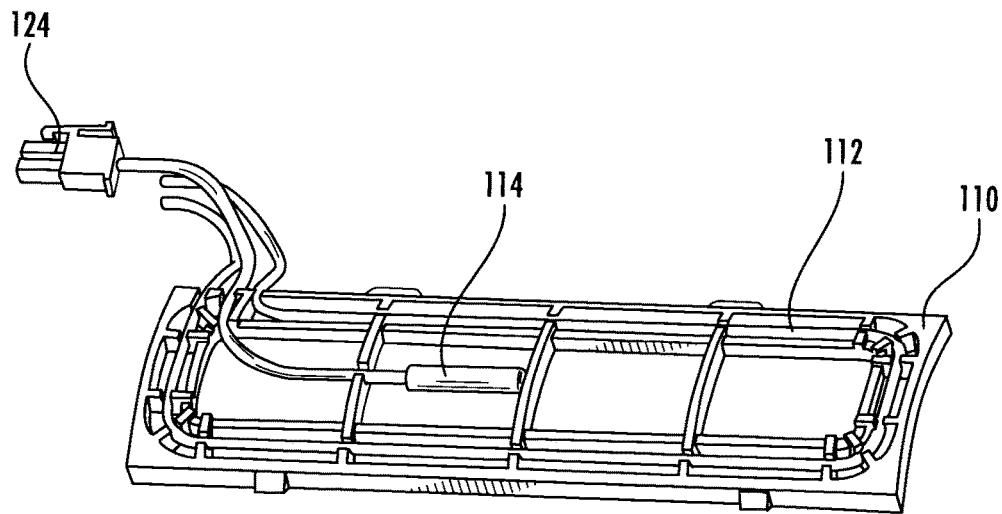
FIG. 9 is a perspective view of a thermistor and heater engaged with the heater bracket.
Figure 10:
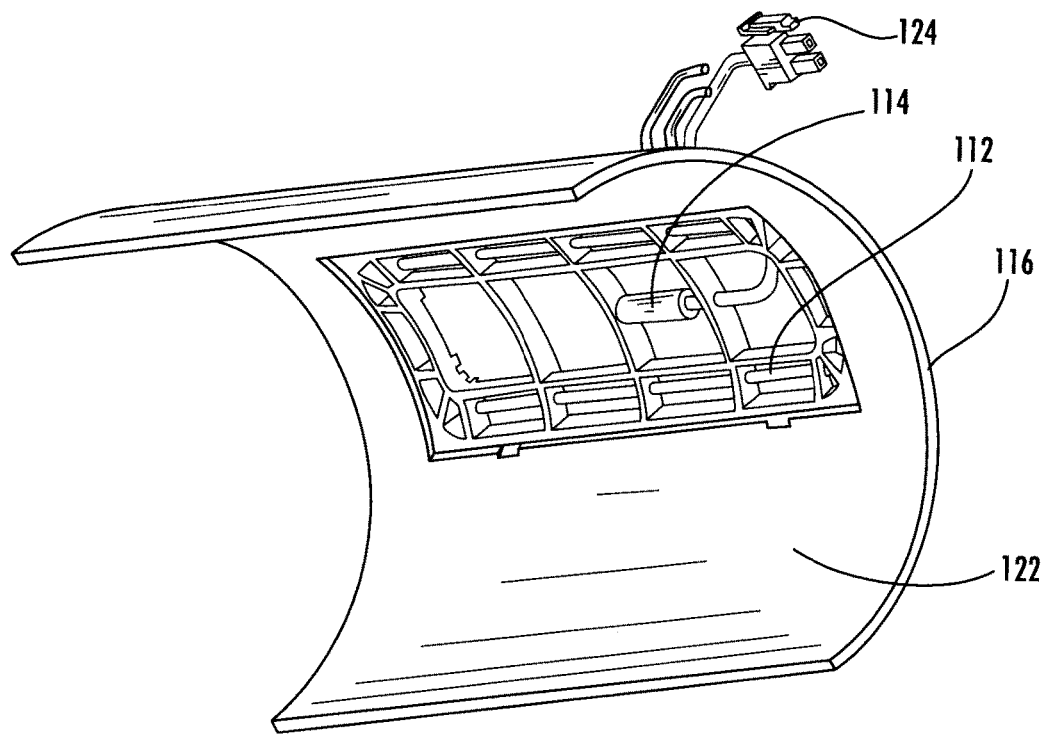
FIG. 10 is a bottom perspective view of the heater bracket engaged with the interior surface of the bracket cover according to an aspect of the present disclosure.

An exploded view of the ice making assembly 100 according to an aspect of the present disclosure is shown in FIG. 4. As shown in FIGS. 4-16, the ice making assembly 100 includes a base frame 102, a channel forming frame 104, a motor assembly section 106, a motor bracket 108, a heater bracket 110 that engages and holds the heater 112, a heater thermistor 114, and a bracket/frame cover or canopy 116. The overall ice making assembly 100 also typically includes an ice making portion 118, which is generally shown in FIGS. 5, 12, 15, and 16. The motor assembly section 106 engages a motor end 132 of the ice making portion in an engaged manner sufficient to rotate the ice making portion 118 at least in the manner discussed herein. As shown in FIG. 9, the heater 112 is typically engaged and either press fit into the heater bracket or engaged and affixed into engagement with the heater bracket using one or a plurality of fasteners. The heater bracket 110 is a support structure for the heater 112. The bracket 110 and heater 112 can be reparable components engaged with one another as discussed above, but may also be formed into one part with injection molding. The heater bracket 110 and heater 112 are typically engaged to the concave, interior-facing surface 122 of the bracket/frame cover 116 (see FIG. 10). The bracket 116 typically has an arcuate-shaped cross-section along its length. The ice piece forming tray cover has a portion of a cylinder shape with the open side facing toward the ice piece forming tray. The heater is positioned on an ice piece forming tray facing side of the ice piece forming tray cover. The cover 116 is spaced a distance above the ice piece forming tray 128. When assembled, the cover 116 includes a heater and a temperature sensor and typically the heater and thermistor are engaged with the heater bracket. The channel forming frame has downwardly extending and generally semicircular air flow channel defining fins that form airflow channels under the ice piece compartments between the first side and the second side of the ice piece forming tray. The fins from the heat sinks are typically at least approximately parallel or parallel to the airflow channel defining fins of the channel forming frame. The channel forming frame may also have a bottom cover portion 120 under the fins to keep air from traveling downward and direct. The motor assembly section 106 engages the motor bracket, which itself engages a surface, which is typically an interior surface, of the appliance 10.

Figure 11:
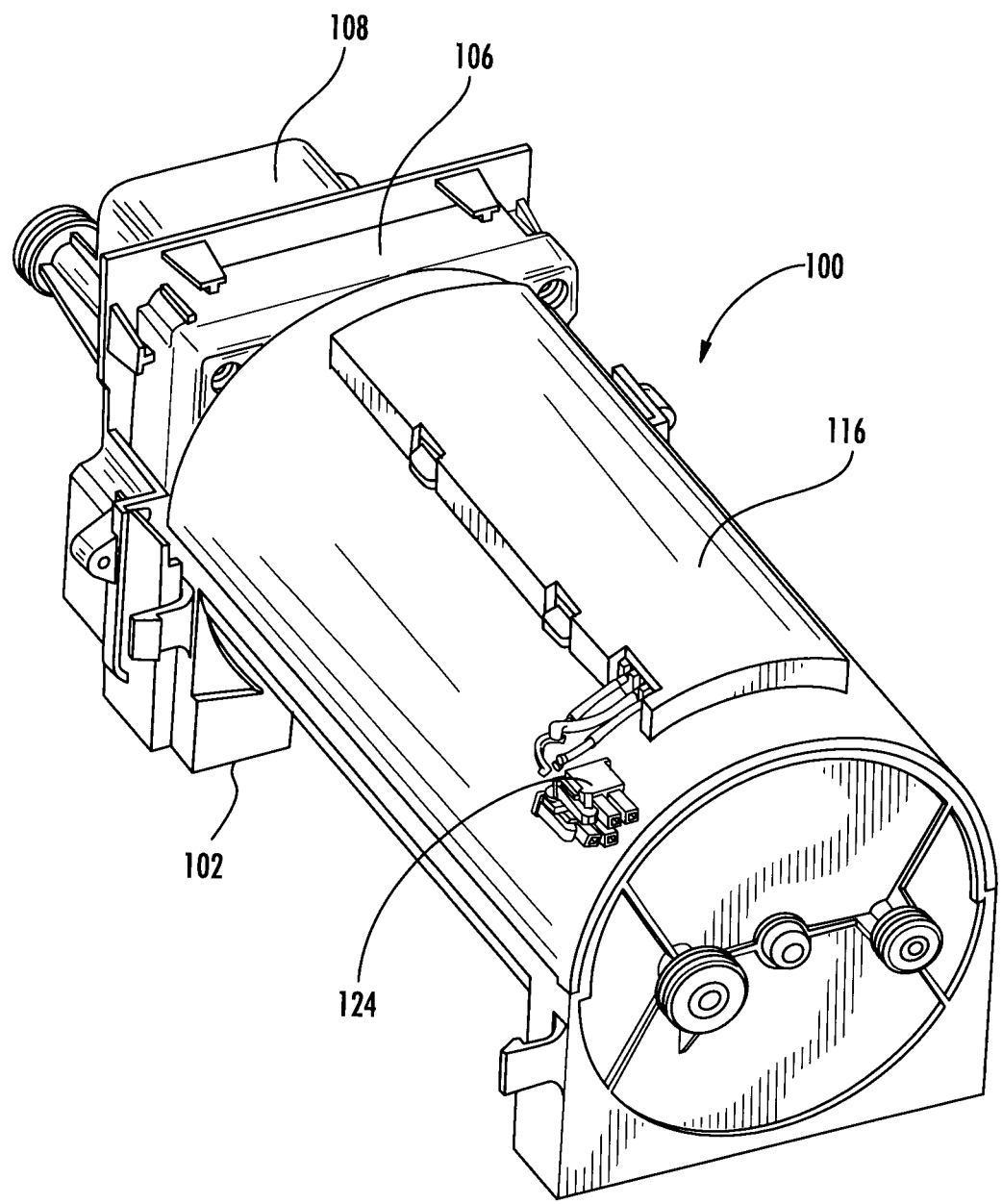
FIG. 11 is a perspective view of an assembled ice maker system according to an aspect of the present disclosure.

The completed assembly is shown in FIG. 11. The electrical/signal connectors 124 are exposed on the outside of the frame cover, which operates somewhat like a canopy over the ice tray. The electrical/signal connectors 124 are then typically snapped into electrical and signal engagement with the overall appliance. This modular system allows for easy engagement and removal of the completed assembly for replacement and repair of the assembly if necessary.

Figure 12:
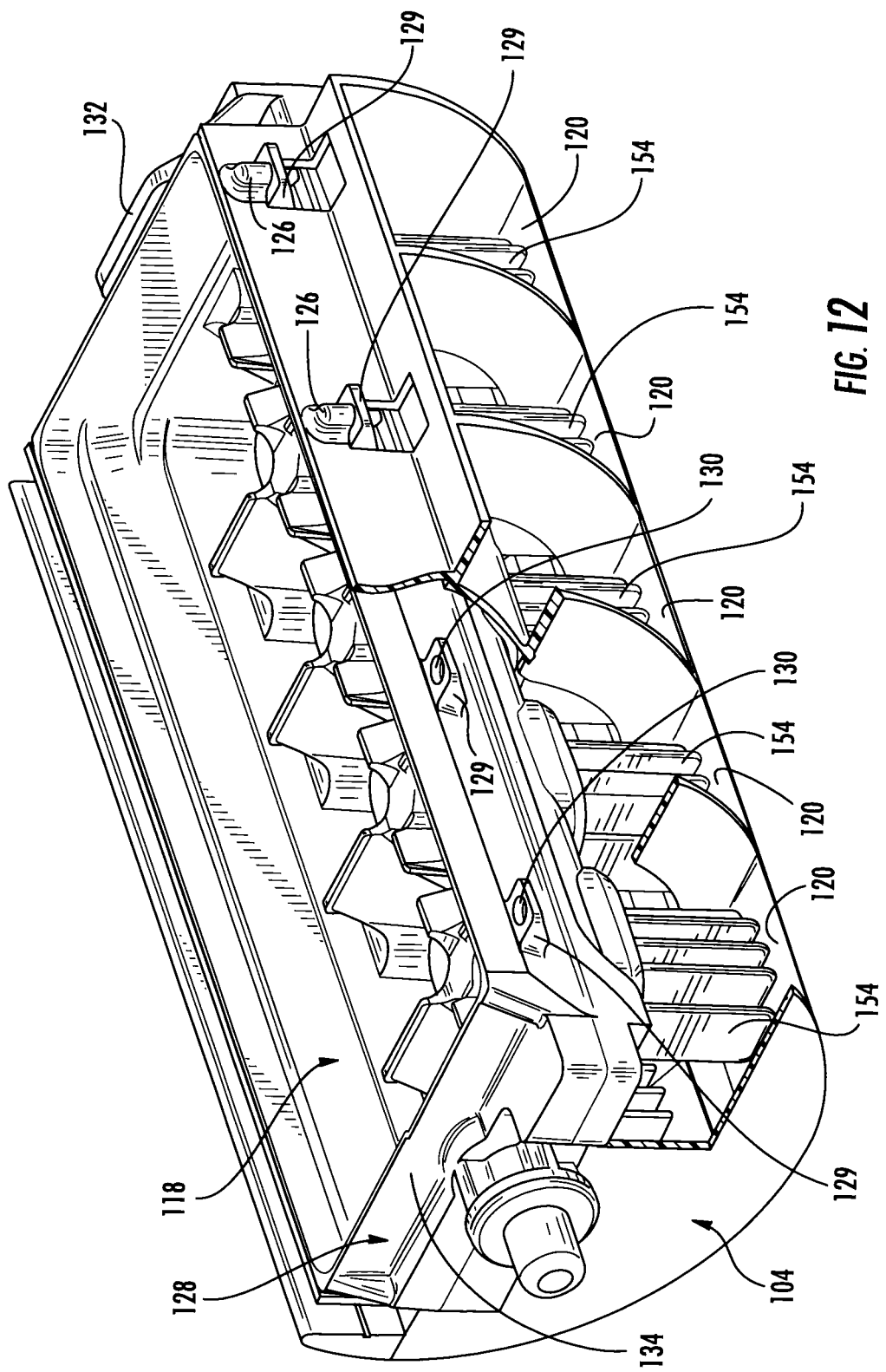
FIG. 12 is a partially cut away perspective view of the channel forming frame and ice making portion according to an aspect of the present disclosure.
Figure 13:
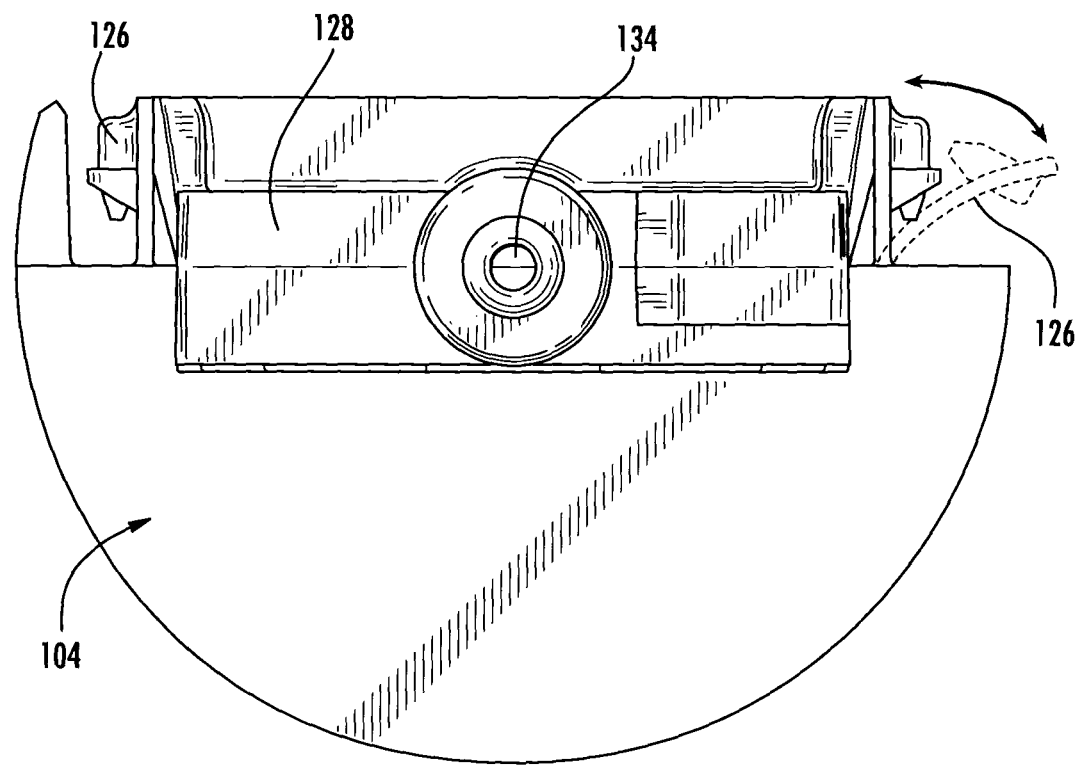
FIG. 13 is an elevated end view of the channel forming frame and ice making portion.
Figure 14:
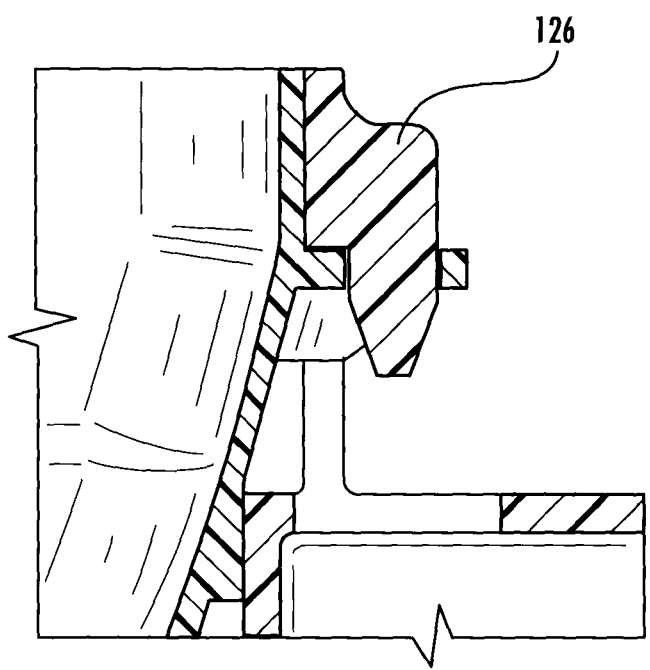
FIG. 14 is a cross-sectional view of the engagement pegs/tabs engaged with the ice making portion of the present disclosure taken along line XIV-XIV in FIG. 15.
Figure 15:
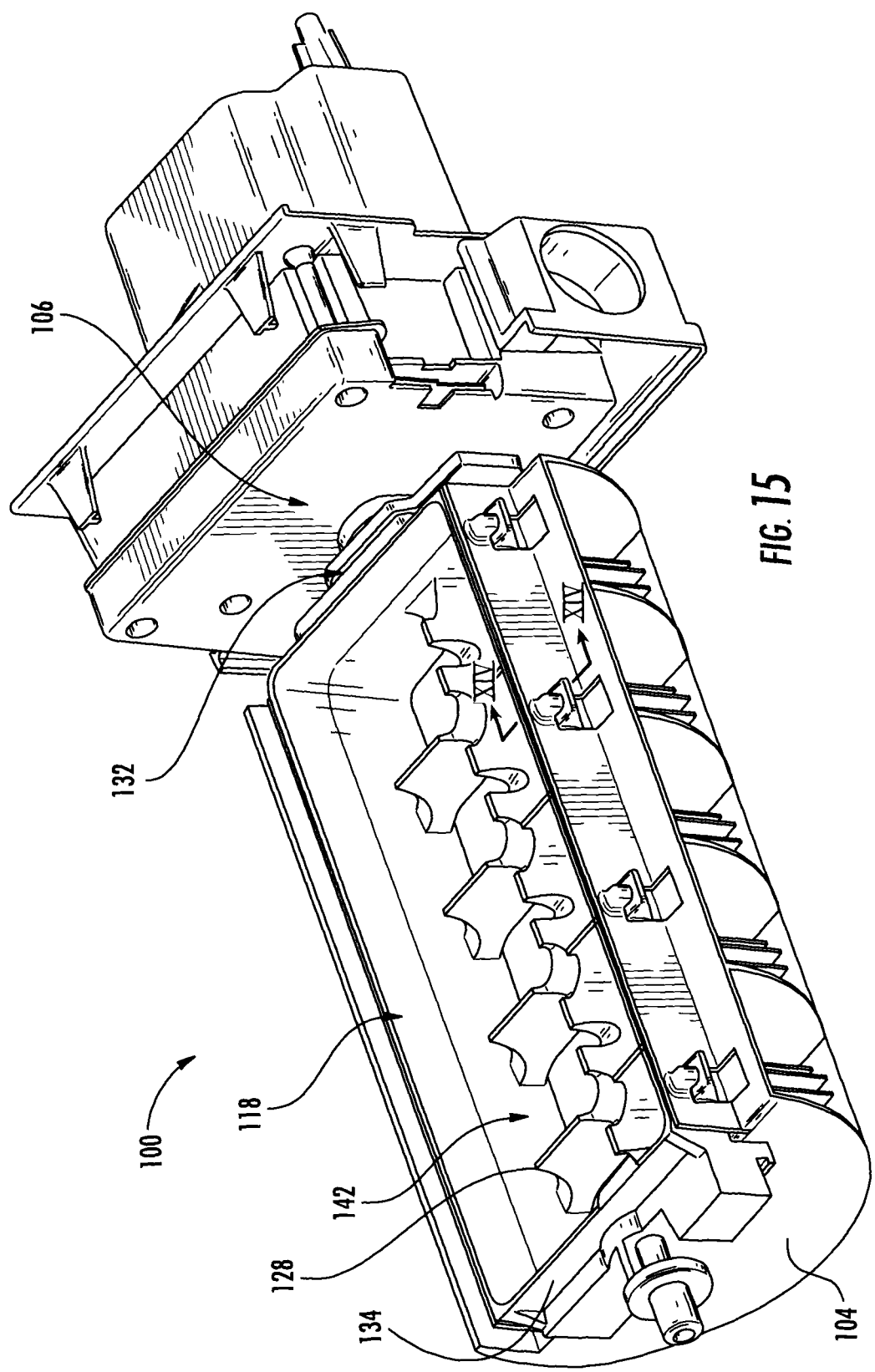
FIG. 15 is a perspective view of the channel forming frame, motor assembly section, and ice making portion according to an aspect of the present disclosure.
Figure 16:
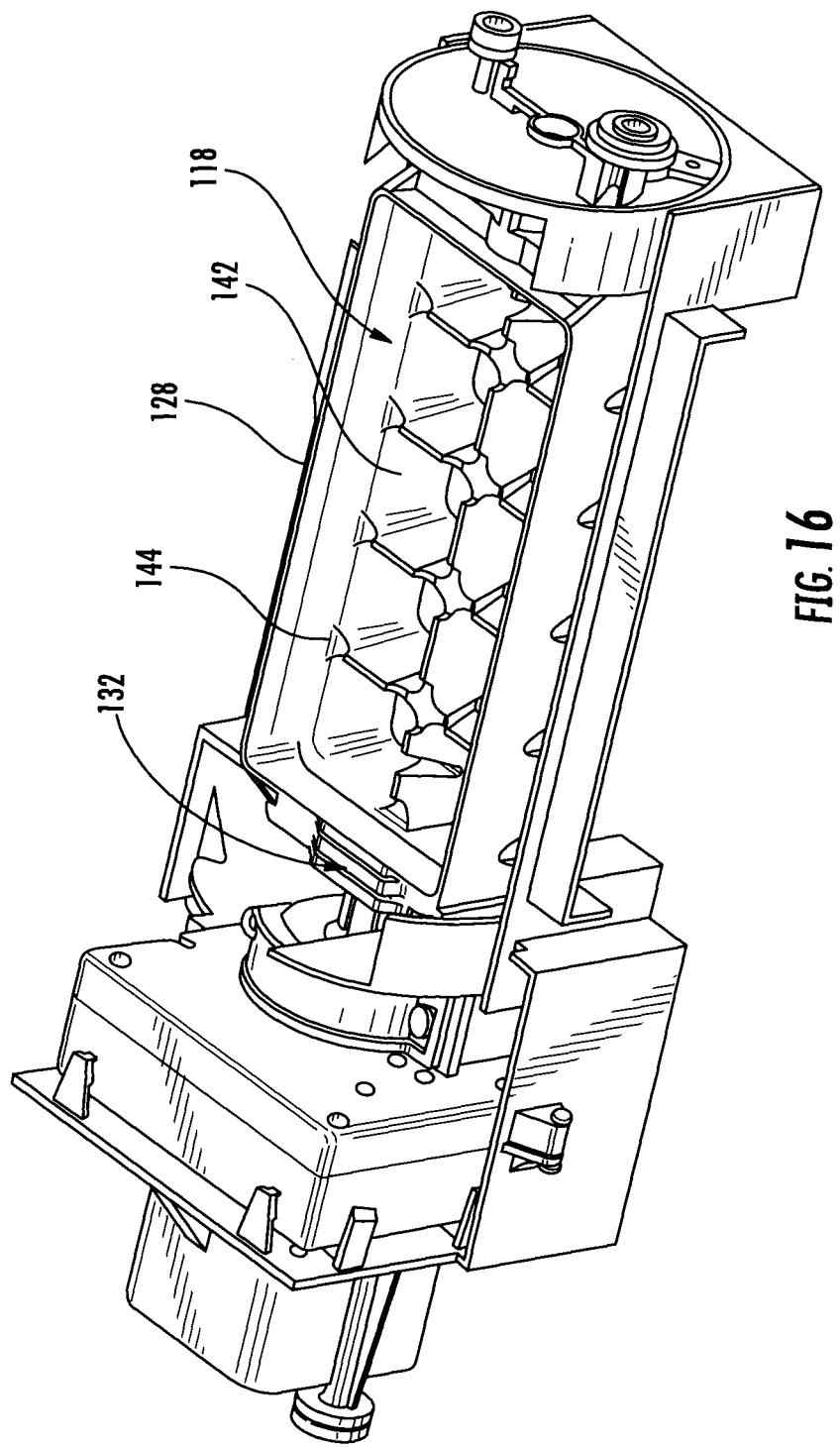
FIG. 16. is a perspective view showing the assembly of the present disclosure with the bracket/frame cover removed.

The ice making portion and the channel forming frame are shown in FIGS. 12-14. The channel forming frame 104 is typically constructed from an elastomeric material. The elastomeric material is typically a thermoplastic elastomer such as a polypropylene or a SANTOPRENE® from Exxon Mobil Corporation, which is a thermoplastic vulcanized rubber, that will remain flexible under freezing conditions. The channel forming frame will typically remain flexible under freezing conditions for extended periods of time up to and including the entire lifetime of the ice making assembly. As shown in the dashed portion of FIG. 13, the engagement tabs 126 of the channel forming frame bend away from the ice tray 128 to engage the channel forming frame 104 into engagement with the ice tray 128. The material is flexible enough to be bent away during installation, but has memory to return back or the same substantially the same unbiased and natural position. The cross-section of the engagement tab is shown in FIG. 14 in the engaged position. The engagement tabs 126 engage tab receiving apertures 130 on the ice tray 128 and retain the channel forming frame in engagement with the ice tray. The tab receiving apertures are present in a plurality of outwardly extending projections 129 (see FIG. 12).

The ice making portion 118 typically includes an ice piece forming tray 128, which is typically a polypropylene copolymer, having a motor engaging end 132, a distal end 134, a first side 136, a second side 138 and a bottom surface 140. The ice making assembly portion also further typically includes a plurality of ice piece making compartments 142 divided by divider walls (weirs) 144 and heat sinks. The divider walls 144 typically have cutout sections 146 on each end that abuts the first side and the second side of the ice piece forming tray to allow water to spill over into joining ice piece forming compartments. Similarly, cutouts are formed along the elongated longitudinal divider walls that may be present in the ice making tray (there can be more than one, but typically the tray is divided into two rows of ice compartments separated by a divider wall 144 along or parallel to the axis of rotation 148 of the ice piece forming tray 118. The divider wall 144 also typically has cutouts 146 between each of the adjoining two ice piece forming compartments.

Figure 17A:
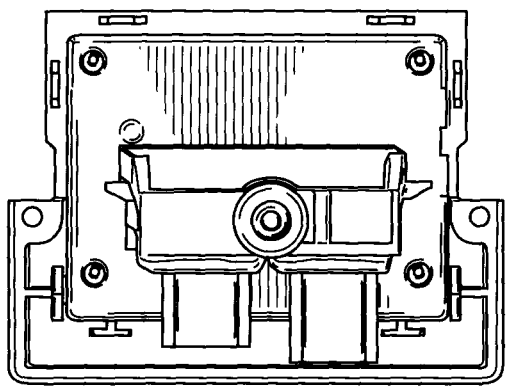
FIG. 17A is an elevated end view of the ice making assembly of the present disclosure with the ice making assembly in the "home" position.
Figure 17B:
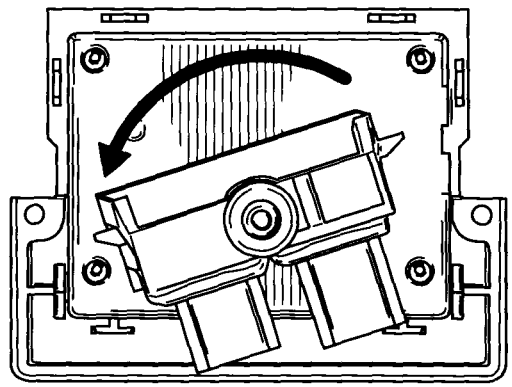
FIG. 17B is an elevated end view of the ice making assembly of the present disclosure with the ice making assembly in a first oscillation position moving counterclockwise.
Figure 17C:
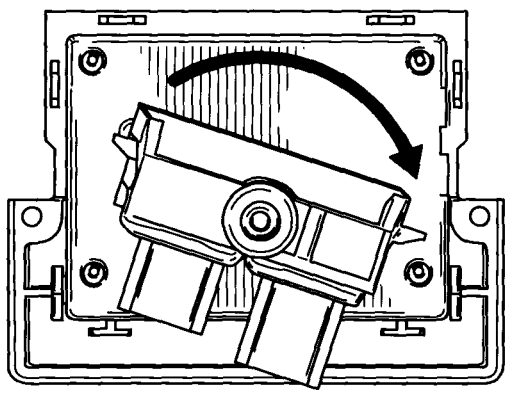
FIG. 17C is an elevated end view of the ice making assembly of the present disclosure with the ice making assembly in another oscillation position moving clockwise.
Figure 17D:
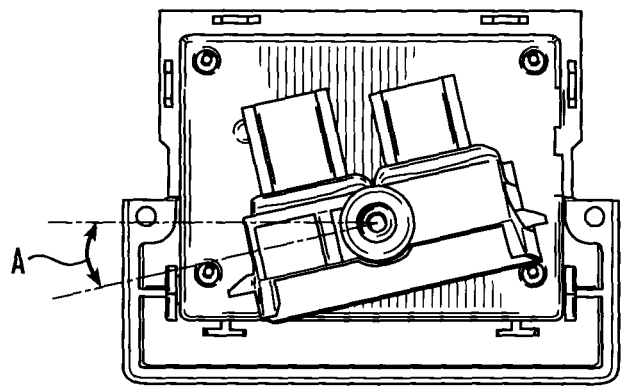
FIG. 17D is an elevated end view of the ice making assembly of the present disclosure with the ice making assembly in an ice releasing and dispensing position that is typically at least about 160 degree rotation about the rotational axis of the ice making assembly and where the fins enter a volume of air spaced below the cover that may be heated by the heater.

The ice making assembly also typically includes a plurality of defrost water water channels 150 positioned at least substantially parallel to or along an axis of rotation 148 of the ice piece forming tray 128 and along at least one of the motor engaging end 132 and the distal end 134. The plurality of defrost water water channels 150 that engage one another in fluid communication with one another and each configured to receive defrost water from a plurality of heat sinks 152 engaged to the bottom surface 140 of the ice making compartments and deliver defrost water to a drain or defrost water catch tray (not shown) positioned at at least one of the distal end and the motor engaging end. Typically this defrost water catch tray would be located at the distal end beneath the area of rotation of the ice making portion. it may be a small catch tray having side walls. The defrost water in the tray would then drain to the evaporator drip tray, which would typically be positioned remote from the ice maker. The water would be deliver to the evaporator drip tray for evaporation via hosing connected to an outlet of the defrost water catch tray and in liquid communication with the evaporator drip tray located remotely from the ice making assembly. The channels would typically have a generally U-shaped cross section and would typically have a radius 200 (see central channel shown in FIG. 19) sufficient to allow for proper plastic formation of the ice piece forming tray 128 and prevent stress concentration during ice piece harvesting. The currently preferred drip point 202 is at the corner of the ice making portion 118. When the drip point 202 is located in this position, the ice making portion 118 is positioned as shown in FIG. 17D before the tray flexes for ice cube release. FIG. 17D shows the ice making portion at an angle A preferred for defrosting the fins, which is the angle that the drip point is from a completely inverted position of ice making portion 118. This angle A is typically approximately from about 135 to about 140 degrees from an inverted position of ice making portion 118. This position for defrost prevents the tray from being flexed while the water runs off the tray and increases tray life. based upon the drip point in the location shown in FIG. 17D, the defrost water water channels 150 are typically designed such that the middle channel (see FIG. 18A) will collect from the fins associated with the right side ice piece forming compartments and the left channel of FIG. 18A will collect defrost water from the fins associated with the left slice dice piece forming compartments. The left channel of FIG. 18A will also collect defrost water runoff from the center channel. The tray design may be symmetrical as shown in the Figures, which allows for flexibility in harvesting direction and facilitates inclusion in multiple refrigerator appliance configurations as discussed above. It also facilitates different installation options and methods.

The heat sinks 152 of the typically have downwardly extending fins 154 that extend away from the bottom surface 140 of the ice piece making compartments 142 and are typically made of metal and engaged with the bottom surface of the individual ice piece forming compartments of the ice tray 128. The ice piece forming tray itself is typically a thermoplastic material that is twistable to release the ice pieces formed within the ice piece forming tray. The downwardly extending fins 154 are typically spaced apart metal planar components that allow airflow laterally between the fins 154.

In order to warm the air blowing over the top of the ice tray 128 during ice piece formation and over the heat sink fins during harvesting, a heater 112 may be employed. The heater 112 may be an electric resistance heater or any other type of heater known in the art. The heater 112 may be disposed on a heater bracket 110, which houses the heater 112 as well as a thermistor 114. The heater, thermistor, and heater bracket are all engaged by a bracket cover 116 (see FIG. 10). The heater and the thermistor are in electrical communication with a controller (not shown) of the appliance. During ice formation, the thermistor senses the temperature of the air being blown over the top of the ice tray 128.

To create the ideal state for directional freezing the cold (below 31° F.) freezer air is directed across the bottom of the tray. The top of the tray will need to be above freezing (>32° F.). To accomplish this an active control is required to maintain the temperature. Too high of a temperature and the ice rate and energy are negatively impacted, too low temperature does not allow for directional cooling. The temperature is preferably from about 37° F. to about 43° F. To maintain this temperature range the heater 112 is used with a feedback temperature sensor or thermistor 114 to allow for heater control and temperature monitoring. The heater 112 is incorporated into a cover 116 over the ice tray 128 isolating the top of the ice tray from the surrounding air allowing the icemaker to be stored in a freezing environment. The temperature sensor 114 signals the control to turn on the heater if temperature drops below a minimum set point and then off as it rises above the maximum set point.

In another embodiment, heat may be added via the use of the following: an air duct, damper, fan, and temperature sensor 114. This will again be a closed loop temperature controlled system, but instead of using an electric heater 112 it will use a damper and fan to direct air to the top of the tray 128. The air supplied from within the refrigerated compartment or similar area that is maintained above the freezing point of water. The damper will open if temperature drops below the threshold and close as it approaches the upper temperature limit.

In another embodiment, waste heat from the electric motor spaced within the motor assembly section 106 may be used. The motor drives the ice tray during the freezing process. The motor will need to generate enough waste heat to maintain this temperature and use a fan that directs the waste heat above the ice tray with a temperature sensor or thermistor 114 controlling the fan operation based on minimum and maximum allowed temperatures.

This directional freezing produces clear ice, as the impurities and air pockets within the cube are forced to the top of the ice cube, as opposed to being forced toward the middle of the ice cube in a typical ice tray.

A seed fill may be used in the ice making process. A seed fill is a small portion of the overall ice tray water capacity introduced into the ice tray, before the ice tray 128 is filled in earnest. This seed fill prevents a filled-to-capacity ice tray from super cooling and preventing directional freezing.

In a typical ice tray 128 there are weirs 144 between the sets of ice making compartments 142. These weirs 144 distribute water between the ice making compartments 142 such that the amount of water in each ice making compartment 142 is relatively even. These weirs 144 are typically not very deep, as deep weirs add to the structural rigidity of the ice tray 128, making removal of the ice from the ice tray 128 more difficult, because it takes more force to twist the ice tray 128 to remove the ice cubes from the ice tray 128. This also prevents an icemaker with a single fill tube from distributing a seed fill into the ice tray without the use of multiple fill tubes.

By adding extra weirs 144*a* at the end of the ice making compartments, water is allowed to flow more freely between the rows of ice making compartments as opposed to just across the columns of ice making compartments 144. As described herein the rows of ice making compartments are defined as those ice making compartments normal to the axis of rotation, and the columns are the ice making compartments along the axis of rotation. These weirs between the rows of ice cavities may be closer to the ice tray perimeter, to allow the water to flow more freely as it is rocked back and forth. These deeper weirs 144 allow a lower amount of seed fill water to be introduced to the ice tray 128 and allow the seed fill to travel between the ice making compartments in a generally even fashion. This configuration allows a seed fill of about 20% of the total capacity of the ice tray, whereas without this configuration a seed fill of less than about 50% may not be able to traverse between ice making compartments to provide an even fill across the ice making compartments 42.

During the seed fill, the tray 128 may be oscillated at a specific angle and frequency. A motor may be operably coupled with the ice tray 128 at one end of the ice tray 128. The motor may be in electrical communication with a control (not shown) which may be a microprocessor or a microcontroller, or any other controlling device known in the art for controlling a system and/or processing signals and providing instructions based upon the signals/input received. The angle and frequency is determined by the water movement within the specific tray 128 for efficient transfer of water from side to side to promote the successful distribution of the seed fill of water as the water freezes. It is also based on the fill volume to prevent water from spilling over the sides of the ice tray 128. After the seed fill occurs, a main fill process will occur. The main fill process will include the addition of a volume of water sufficient to produce final ice pieces within each of the ice piece forming compartments and thereafter, the tray 128 is oscillated at a specific angle and frequency to produce clear ice. The angle and frequency may be adjusted, but will be such as to avoid water washing out of the ice piece forming compartments/prevent spillage. The angle and frequency are adjusted based on fill volume to allow successful washing during freeze process and fill volume to prevent water spillage. This rotation aids in allowing impurities within the water to escape and the water to freeze more clearly, typically such that clear ice forms, which is ice that is clear to the naked eye.

The tray may be rotated to an angle of 30-50 degrees, more preferably about 40 degrees clockwise and counterclockwise, in any event not as far as to engage the stop 32. As the tray is rotated clockwise and counterclockwise, the tray may be held for 2-5 seconds to allow the water migration from cube to cube, more preferably about 3 seconds. This rocking motion and method is capable of distributing about 20 cubic centimeters of water across the ten cubes as shown in the tray 128 substantially evenly, or about 2 cubic centimeters per ice cube, with total ice cube volume of about 10 cubic centimeters each. This rotation facilitates even dispersement of the fill water within the ice mold 128 prior to freezing.

Figure 19:
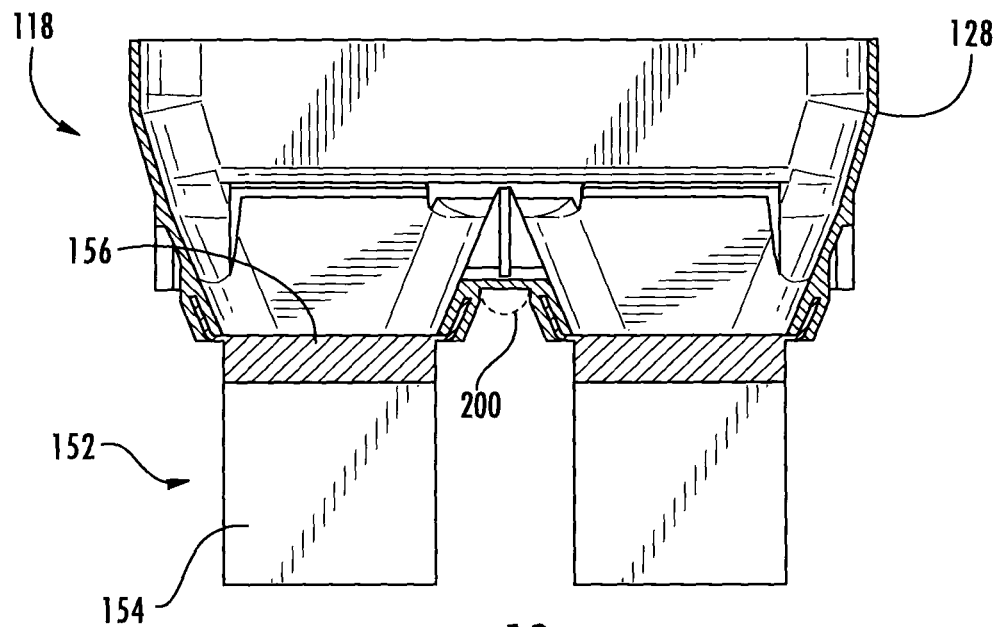
FIG. 19 is a cross-sectional view of the ice making portion taken along line IXXIXX according to an aspect of the present disclosure.
Figure 20:
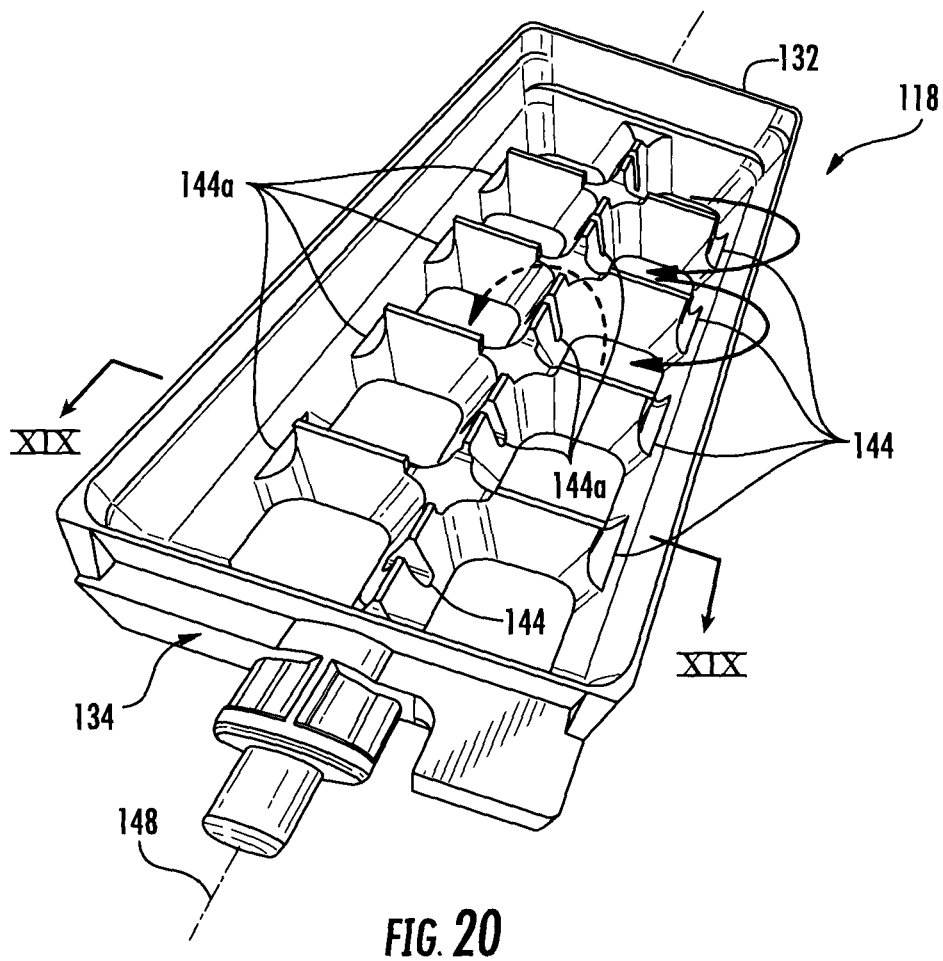
FIG. 20 is a perspective view of the ice try according to an aspect of the present disclosure.
Figure 21:
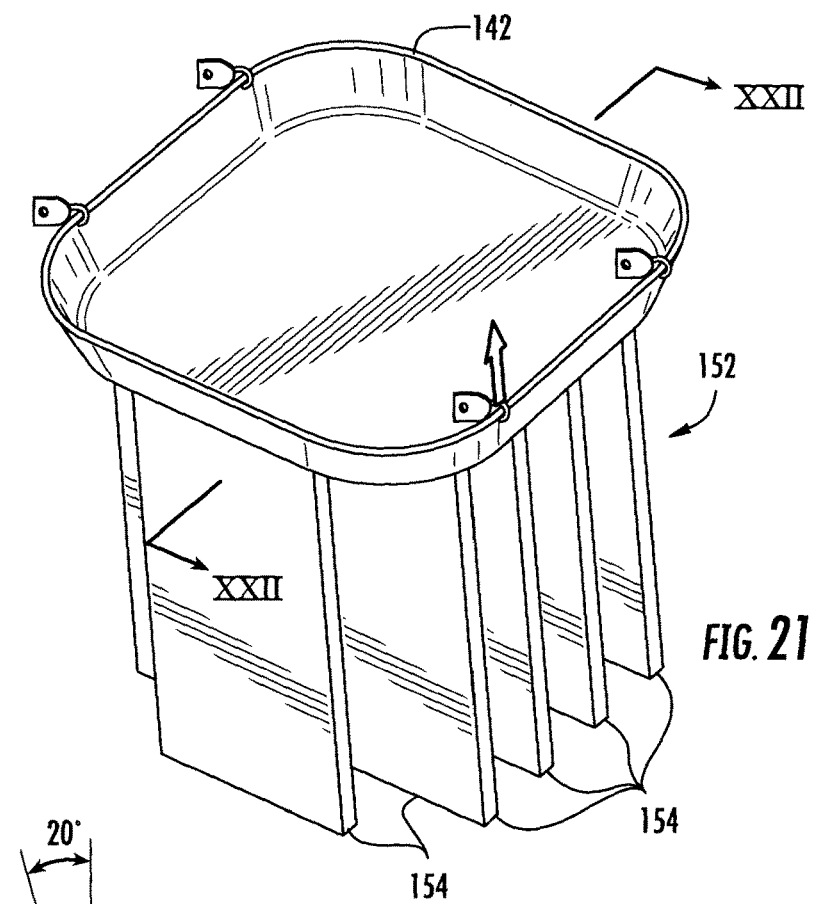
FIG. 21 shows an isometric view of a heat sink of an embodiment.

FIGS. 12 and 19 generally show the addition of heat sinks 152 to the bottom of the ice making compartments 142. The heat sink 152 may be comprised of one or more heat sinks fins 154. These heat sinks fins 154 allow more efficient heat carrying capabilities to remove the heat from the water in the ice making compartment 142 into the air flow below the ice making compartments that passes around and between the heat sink fins 154. The fins 154 have a thickness and have a pair of substantially parallel planar surfaces that extend in a generally downward direction from the bottom of the heat sink base 156.

FIGS. 12 and 19 generally show the ice tray 128 with the heat sinks 152 below each ice making compartment 142. FIG. 12 shows the heat sink 60 further include a heat sink base 64 which attaches to or is otherwise engaged with the bottom side of the ice making compartments 142. The thickness of the heat sink base 156 may be anywhere from 0.7 millimeters to 4.8 millimeters, preferably 0.7 millimeters. The lower the thickness of the heat sink base 64 allows for greater flexibility of the ice tray 128 during the harvesting process.

The heat sinks may be integrated into the ice tray 128 by overmolding the heat sinks within a plastic ice tray mold. The heat sinks 152 may be placed into a plastic injection mold machine (not shown) and located within the mold. A plastic material in liquid form is then injected around the heat sinks 152 and allowed to cool. This process integrates the heat sinks 152 and the plastic portion of the ice tray 128 as if they were a single part. The heat sink base 156 may mate with the bottom of the ice making compartments 142, or the heat sink base may be used as the bottom of the ice making compartments 142. In this case, no plastic is injected over the top portion of the heat sink base 156, which allows for more efficient heat exchange between the heat sink 152 and the water within the ice tray 128.

Figure 22:
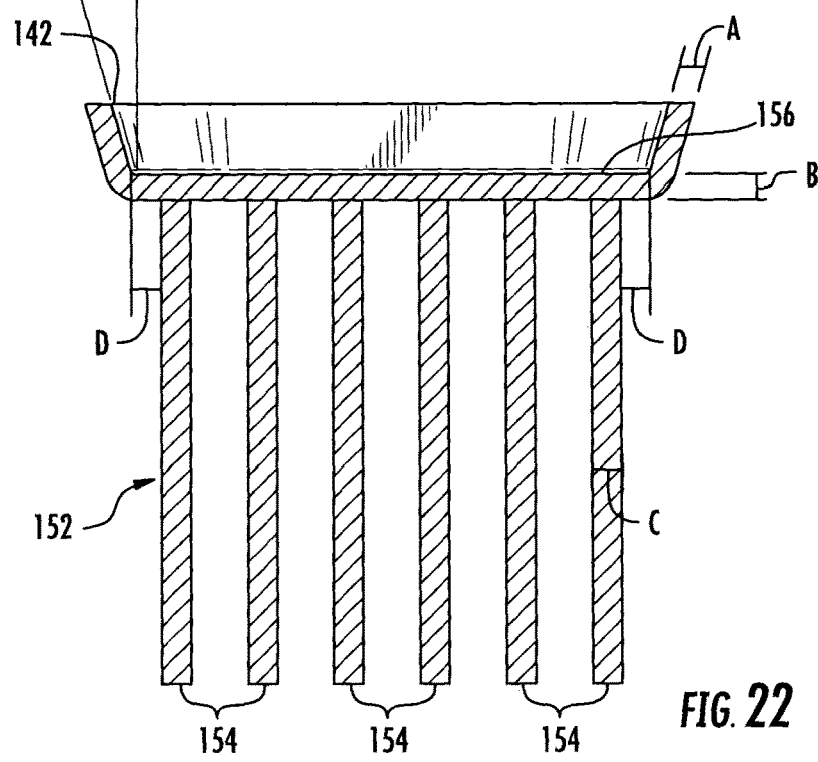
FIG. 22 is a cross-sectional view taken along line XXII-XXII in FIG. 21.

FIG. 22 is a cross section view through a center portion of the ice tray 128 with the heat sinks 152 attached. The heat sink base 156 thickness is generally denoted by dimension A and is 0.7 to 4.8 millimeters, preferably 0.7 millimeters. Dimension B is a top surface of the heat sink base 156 which is generally 15.6 by 17.2 millimeters. The heat sink base 156 may also have a side wall 158 that generally conforms to the bottom of the side walls of the ice making compartments. Dimension C is the side wall angle of the heat sink base 156 and is generally 19 degrees to 26 degrees, preferably about 20 degrees. The ice making compartment 142 with the heat sink attached may include two cupped walls, instead of walls around all four sides of the bottom surface of the ice making compartment(s) to allow for a better flexing of the ice tray 128.

To harvest the ice within the ice tray 128 after the water has frozen into ice cubes, the tray 128 is rotated about 150-170 degrees, preferably about 160 degrees, such that the distal end of the ice tray 128 from the motor abuts a stop. The motor then continues to rotate the tray about another 30 to 50 degrees, preferably about 40 degrees, typically imparting about a 40 degree twist in the tray. The twist action causes the ice cubes to release from the tray and from each other, and allows them to fall out due to the force of gravity. This saves energy and is more efficient than an ice tray that employs a separate heater or thermoelectric to cause a melt portion of the ice cube to release it from the tray 128. The ice pieces formed in the ice tray are typically at least substantially free, but more typically free of occlusions of captured air visible to the naked eye.

Figure 18B:
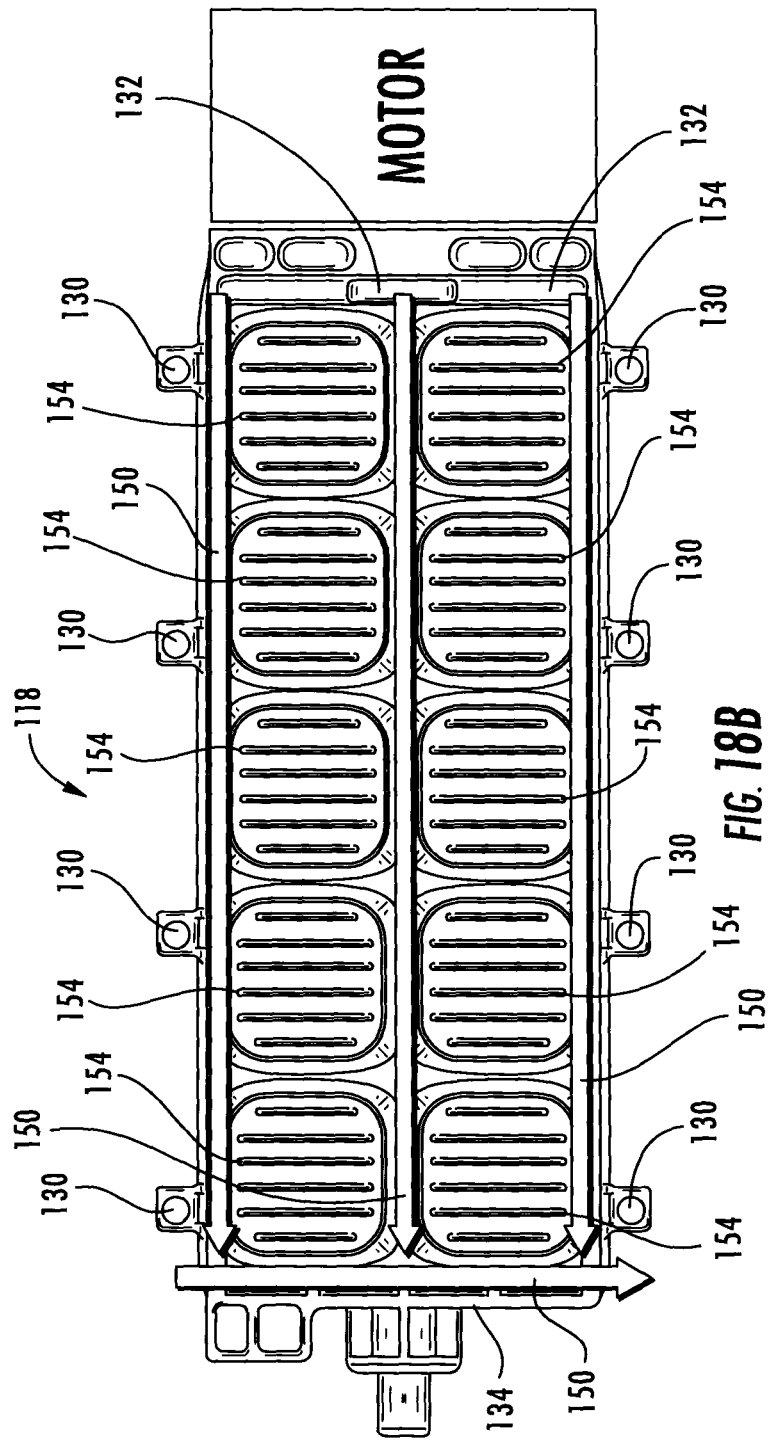
FIG. 18B is a schematic bottom view of the ice making assembly according to an aspect of the present disclosure where the defrost water water channels convey defrost water to an alternative corner of the ice making assembly at the distal end of the ice piece forming tray.

The use of metal heat sinks as described above have a significant drawback to their use. In particular, the metal may have frost build up over time. Accordingly, not only does the heater 112 provide for improved directional freezing during the freezing process, but the heater may be activated to a heating mode when the ice harvesting is occurring to both loosen the ice cubes within the ice forming compartments and, significantly, to melt frost that may have formed on the metal heat sinks and/or heat sink fins to form defrost water that is then received into channels and directed through one or more channels to an outlet or evaporation location. Typically, the outlet or evaporation location will be on the distal end of the ice making portion, but could also be at the motor end of the ice making portion as shown in FIGS. 18A-C. Accordingly, the present disclosure also contemplates a method of defrosting frost from the heat sinks overall and the heat sink fins in particular that are on the bottom surface and extending downward from the bottom surface of an ice tray by rotating the tray to both release the ice pieces formed in the tray and to defrost the fins by bringing the frost covered fins into closer proximity to the heater in the canopy and into a space having a temperature above freezing.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present innovation. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An ice making assembly comprising:
   an ice piece forming tray having a motor engaging end, a distal end, a first side, a second side and a bottom surface and a plurality of ice piece making compartments divided by divider walls and a plurality of defrost water water channels;
   wherein at least one defrost water water channel is positioned at least substantially parallel to or along an axis of rotation of the ice piece forming tray, and wherein the at least one defrost water water channel is an elongated channel between and along at least one of the motor engaging end and the distal end; and
   wherein each of the plurality of defrost water water channels that engage one another in fluid communication with one another and each configured to receive defrost water from a plurality of heat sinks engaged to a bottom surface of the plurality of ice piece making compartments and deliver defrost water to a drain or defrost water catch tray positioned at at least one of the distal end and the motor engaging end.

2. The ice making assembly of claim 1, wherein the heat sinks have downwardly extending fins that extend away from the bottom surface of the plurality of ice piece making compartments and wherein the elongated channel extends from the motor engaging end to the distal end.

3. The ice making assembly of claim 2, wherein an ice piece forming tray cover is spaced a distance above the ice piece forming tray and wherein the ice piece forming tray cover comprises a heater.

4. The ice making assembly of claim 3, wherein the ice piece forming tray cover has an arcuate-shaped cross-section along is length.

5. The ice making assembly of claim 4, wherein the ice piece forming tray cover has a portion of a cylinder shape with an open side facing toward the ice piece forming tray and wherein the heater is positioned on an ice piece forming tray facing side of the ice piece forming tray cover.

6. The ice making assembly of claim 3 further comprising a temperature sensor associated with the ice piece forming tray cover and configured to sense a temperature of air retained under an ice piece forming tray facing side of the ice piece forming tray cover and wherein the temperature sensor in conjunction with the heater, maintain a temperature of air retained under the ice piece forming tray cover at a temperature above freezing thereby allowing the ice making assembly to form at least substantially clear ice pieces within the plurality of ice piece making compartments.

7. The ice making assembly of claim 6, wherein the ice making assembly is free of a heater engaged with the ice piece forming tray and the ice piece forming tray is made of a plastic and the heat sinks and fins are a metal and wherein the ice piece forming tray cover has a portion of a cylinder shape, wherein the portion of the cylinder shape is an about half of a cylinder shape.

8. The ice making assembly of claim 7, wherein the ice piece forming tray is sufficiently flexible to release ice pieces formed within the ice piece forming tray when inverted and twisted.

9. The ice making assembly of claim 1 further comprising an ice piece forming tray cover spaced a distance above the ice piece forming tray wherein the ice piece forming tray cover comprises a heater and a temperature sensor.

10. The ice making assembly of claim 9, wherein the temperature sensor associated with the ice piece forming tray cover is configured to sense a temperature of air retained under an ice piece forming tray facing side of the ice piece forming tray cover and the ice making assembly further comprises an oscillating motor engaged to at least the motor engaging end of the ice piece forming tray configured to rotate the ice piece forming tray back and forth while ice pieces are being formed and also at least about 160 degrees from a home level position, where the plurality of ice piece making compartments face upward, to an inverted, ice pieces liberating position where the ice piece forming tray is twisted and ice pieces are liberated from the plurality of ice piece making compartments and dispensed.

11. The ice making assembly of claim 9, wherein ice pieces formed in the ice piece forming tray are free of occlusions of captured air visible to a naked eye.

12. The ice making assembly of claim 1, wherein the ice piece forming tray further comprising air flow channel defining fins that form airflow channels under the ice piece compartments between the first side and the second side of the ice piece forming tray.

13. A refrigerator comprising:
   an ice piece making assembly that produces ice pieces by directional freezing comprising:
   an ice piece forming tray having a motor engaging end, a distal end, a first side, a second side, a plurality of ice piece making compartments divided by divider walls, and a plurality of heat sinks engaged to a bottom surface of the plurality of ice piece making compartments and wherein defrost water is delivered to a drain or defrost water catch tray positioned at at least one of the distal end and the motor engaging end; and
   an ice piece forming tray canopy spaced a distance above the ice piece forming tray, wherein the ice piece forming tray canopy comprises a heater and a temperature sensor and wherein the ice piece forming tray canopy extends from the first side to the second side of the ice piece forming tray and over a top of the ice forming tray.

14. The refrigerator of claim 13, wherein the ice pieces produced by the ice piece making assembly are free of occlusions of trapped air visible to a naked eye of a human.

15. The refrigerator of claim 13, wherein the ice piece making assembly further comprises a plurality of defrost water water channels positioned at least substantially parallel to or along an axis of rotation of the ice piece forming tray and along at least one of the motor engaging end and the distal end wherein each of the plurality of defrost water water channels that engage one another in fluid communication with one another and each configured to receive defrost water from the plurality of heat sinks engaged to the bottom surface of the plurality of ice piece making compartments and deliver defrost water to the drain or defrost water catch tray positioned at at least one of the distal end and the motor engaging end.

16. The refrigerator of claim 15, wherein the ice piece forming tray canopy has a substantially half cylinder shape with an open side facing toward the ice piece forming tray and wherein the heater is positioned on an ice piece forming tray facing side of the ice piece forming tray canopy.

17. The refrigerator of claim 16, wherein the temperature sensor associated with the ice piece forming tray canopy and configured to sense a temperature of air retained under the ice piece forming tray facing side of the ice piece forming tray canopy and, in conjunction with the heater, maintain a temperature of air retained under the ice piece forming tray canopy at a temperature above freezing thereby allowing the ice piece making assembly to form at least substantially clear ice pieces within the plurality of ice piece making compartments.

18. The refrigerator of claim 13, wherein the ice piece forming tray canopy comprises a contiguous arcuate-shaped cross-section along its entire length.

19. A method of making ice pieces comprising the steps of:
   providing an ice making assembly comprising: a motor; an ice piece forming tray having a motor engaging end, a distal end, a first side, and a second side; and a plurality of ice piece making compartments divided by divider walls;
   a plurality of metal heat sinks engaged to a bottom surface of the plurality of ice piece making compartments, wherein the heat sinks have a plurality of downwardly extending and spaced apart fins that extend away from the bottom surface of each of the plurality of ice piece making compartment;
   at least one defrost water water channel wherein at least one defrost water water channel is positioned at least substantially parallel to or along an axis of rotation of the ice piece forming tray and along at least one of the motor engaging end and the distal end wherein the at least one defrost water water channel engage one another in fluid communication with one another;
   placing an ice piece forming tray canopy a spaced distance above and coving the ice piece forming tray wherein the ice piece forming tray canopy includes a heater and a temperature sensor;
   filling at least one of the plurality of ice piece making compartments with an amount of water;
   oscillating the ice piece forming tray;
   using the temperature sensor and the heater to maintain an air temperature above the plurality of ice piece making compartments above freezing during at least a portion of a time for forming the ice pieces;
   moving air below 32 degrees Fahrenheit through spaces between the plurality of downwardly extending and spaced apart fins; forming the ice pieces within the plurality of ice piece making compartments directionally with freezing starting from a portion of the plurality of ice piece making compartments distal from the canopy and proximate the heat sink and toward a top of the plurality of ice piece making compartments;
   rotating the ice piece forming tray with one or more formed ice pieces spaced within the plurality of ice piece making compartments that were filled with water to invert the ice piece forming tray until the tray is at least about 160 rotated from its level, flat, and ice piece forming compartment upwardly facing position; and
   twisting the ice piece forming tray to release the one or more ice pieces within the ice piece forming tray; and
   wherein the step of rotating the ice piece forming tray comprises moving the plurality of downwardly extending and spaced apart fins into closer proximity to the canopy and into a volume of air proximate the canopy that has a temperature above freezing due to heat applied to the volume of air proximate the canopy from the heater such that frost on the plurality of downwardly extending and spaced apart fins melts and enters at least one of the at least one defrost water water channels.

20. The method of claim 19, wherein the ice pieces are at least substantially free of air occlusions that are visible by a naked eye and the method further comprises the step of:
   delivering defrost water to a drain or defrost water catch tray positioned at at least one of the distal end and the motor engaging end; and
   wherein the step of twisting the ice piece forming tray to release the one or more ice pieces within the ice piece forming tray includes twisting the ice piece forming tray by rotating the tray such that the distal end of the ice piece forming tray engages an ice tray stop at a distal end corner of the ice piece forming tray to twist the tray about its axis of rotation and release the one or more ice pieces; wherein the step of oscillating the ice piece forming tray includes oscillating the ice piece forming tray back and forth such that water spills over the divider walls between the plurality of ice piece making compartments and not out of the ice piece forming tray and wherein the ice piece forming tray canopy has an arcuate-shaped cross-section along substantially all of its length; and
   wherein the heater is positioned on an ice piece forming tray facing side of the ice piece forming tray canopy and wherein the temperature sensor senses the temperature of the volume of air proximate the ice piece forming tray canopy and is operably connected with a controller that controls the heater to maintain the temperature of the volume of air proximate the ice piece forming tray canopy at a temperature above freezing.

* * * * *